(12) United States Patent
Fukazawa et al.

(10) Patent No.: US 11,117,588 B2
(45) Date of Patent: Sep. 14, 2021

(54) VEHICLE

(71) Applicant: YAMAHA HATSUDOKI KABUSHIKI KAISHA, Iwata (JP)

(72) Inventors: Yuichiro Fukazawa, Iwata (JP); Naotsugu Kamiya, Iwata (JP); Masaki Shimazaki, Iwata (JP); Takahiro Ozawa, Iwata (JP); Seiya Uno, Iwata (JP); Takuya Okamoto, Iwata (JP); Mitsutoshi Koide, Iwata (JP); Yoshitsugu Kosugi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 34 days.

(21) Appl. No.: 16/739,604

(22) Filed: Jan. 10, 2020

(65) Prior Publication Data

US 2020/0148207 A1 May 14, 2020

Related U.S. Application Data

(63) Continuation-in-part of application No. PCT/JP2018/026515, filed on Jul. 13, 2018.

(30) Foreign Application Priority Data

Jul. 14, 2017 (JP) .............................. JP2017-137667

(51) Int. Cl.
*B60W 30/188* (2012.01)
*B60K 17/22* (2006.01)
*B60W 10/06* (2006.01)
*B60W 10/10* (2012.01)
(Continued)

(52) U.S. Cl.
CPC ........... *B60W 30/188* (2013.01); *B60K 17/22* (2013.01); *B60W 10/06* (2013.01); *B60W 10/10* (2013.01);
(Continued)

(58) Field of Classification Search
CPC .... B60W 10/06; B60W 10/10; B60W 30/025; B60W 30/188; B60W 30/19;
(Continued)

(56) References Cited

U.S. PATENT DOCUMENTS

| 6,569,059 | B1 | 5/2003 | Ito |
| 6,574,535 | B1 * | 6/2003 | Morris ................... B60W 10/10 701/22 |
| 8,510,021 | B2 | 8/2013 | Takenaka et al. |
| 9,052,006 | B1 * | 6/2015 | Kim ....................... B60W 10/06 |

(Continued)

FOREIGN PATENT DOCUMENTS

| EP | 3061661 A1 | 8/2016 |
| FR | 3028292 A1 | 5/2016 |

(Continued)

*Primary Examiner* — Edwin A Young
(74) *Attorney, Agent, or Firm* — Rabin & Berdo, P.C.

(57) ABSTRACT

When controlling a driving source torque in order to accelerate a driving wheel, a driving source torque controller performs shock suppression control of controlling the driving source torque based on an acquired driving source torque so that at least one of (i) an absolute value of relative speed between power transmission members on a power transmission path decreases when backlash between the power transmission members decreases or (ii) a transmission torque which is transmitted between the power transmission members on the power transmission path decreases when the backlash between the power transmission members is eliminated.

15 Claims, 7 Drawing Sheets

(51) Int. Cl.
*F02D 41/02* (2006.01)
*F02D 41/10* (2006.01)

(52) U.S. Cl.
CPC ......... *F02D 41/0225* (2013.01); *F02D 41/10* (2013.01); *F02D 2200/0404* (2013.01); *F02D 2200/101* (2013.01); *F02D 2200/602* (2013.01); *F02D 2250/18* (2013.01)

(58) Field of Classification Search
CPC ........... B60W 30/20; B60W 2030/206; B60W 2300/36; B60K 17/22; F02D 41/0225; F02D 41/10
See application file for complete search history.

(56) References Cited

U.S. PATENT DOCUMENTS

| | | | |
|---|---|---|---|
| 2003/0116130 A1 | 6/2003 | Kisaka et al. | |
| 2005/0234624 A1 | 10/2005 | Matsushima et al. | |
| 2007/0254772 A1 | 11/2007 | Satou et al. | |
| 2011/0130932 A1* | 6/2011 | Takenaka et al. | |
| 2017/0066437 A1* | 3/2017 | Yamamoto | B60W 10/06 |
| 2017/0355362 A1* | 12/2017 | Reed | B60K 6/48 |

FOREIGN PATENT DOCUMENTS

| | | |
|---|---|---|
| JP | H08-296475 A | 11/1996 |
| JP | 2000-229526 A | 8/2000 |
| JP | 2005-321088 A | 11/2005 |
| JP | 2007-292031 A | 11/2007 |
| JP | 2011-111133 A | 6/2011 |
| JP | 2012057600 A | 3/2012 |

\* cited by examiner

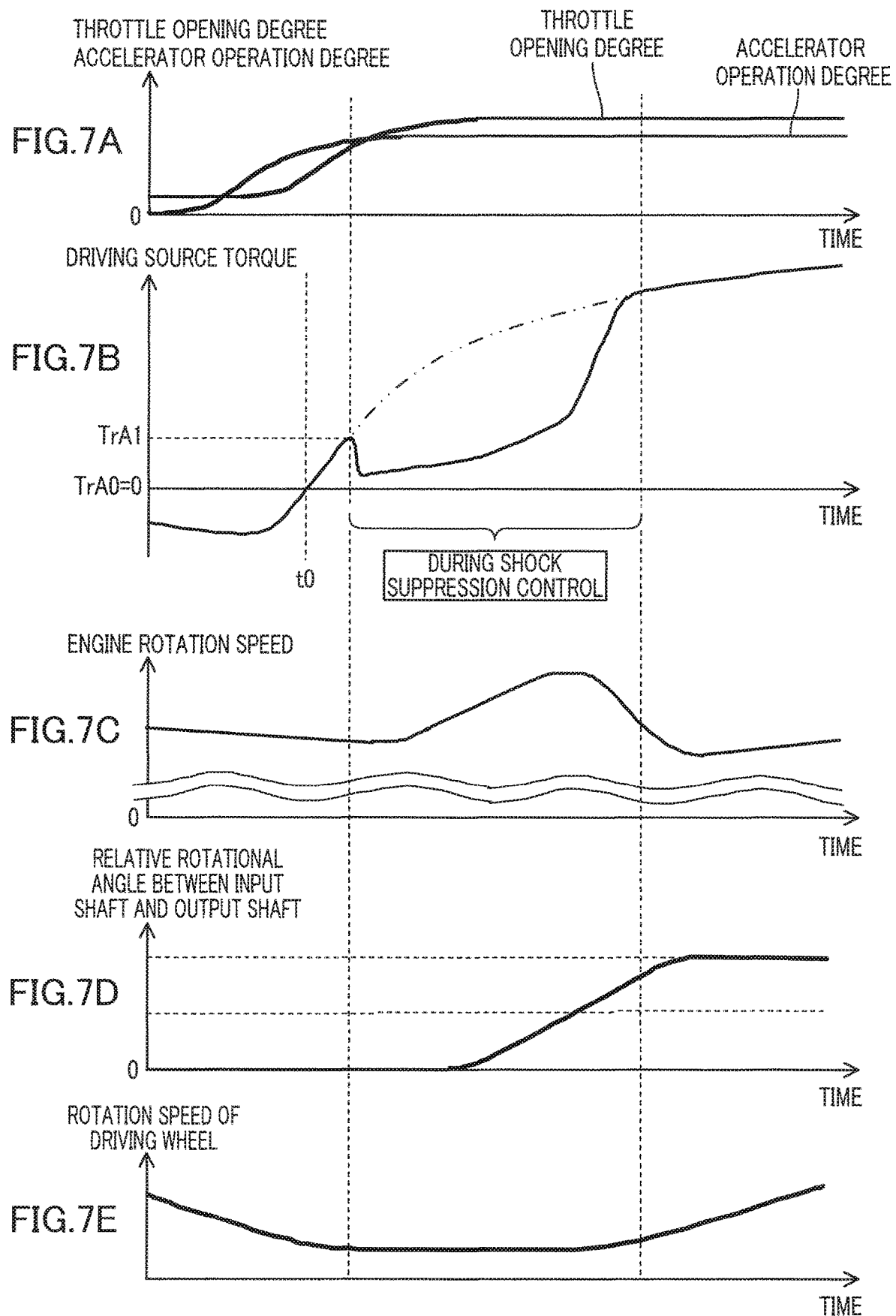

VEHICLE

CROSS-REFERENCE TO RELATED APPLICATIONS

This application is a continuation-in-part of International Application No. PCT/JP2018/026515, filed on Jul. 13, 2018, and claims the benefit of the earlier filing date of International Application No. PCT/JP2018/026515 and of Japanese Patent Application No. 2017-137667, filed on Jul. 14, 2017. The entire contents of each of the identified applications are incorporated herein by reference.

BACKGROUND

Technical Field

The present teaching relates to a vehicle including a plurality of power transmission members provided on a power transmission path on which power is transmitted between a driving source and a driving wheel.

Background Art

In vehicles such as motorcycles, power is transmitted between a driving source such as an engine and a driving wheel. A plurality of power transmission members are provided on a power transmission path between the driving source and the driving wheel. Examples of two power transmission members which make contact with each other to transmit power are gears, dog members, spline members, a sprocket and a chain, and a pulley and a belt. Such power transmission members are disposed so that there is play or backlash between the members.

Due to increase or decrease of engine rotation speed or due to engine braking, these two power transmission members may become different in rotation speed. As a result, the two power transmission members are temporarily detached from each other. In other words, the location of the backlash between the two power transmission members becomes different. Thereafter, the two power transmission members make contact with each other again. The shock due to this contact is transmitted to the entire vehicle such as a motorcycle.

For example, Patent Literature 1 (identified further on) discloses a vehicle in which the shock to the vehicle is suppressed. The driving source of this vehicle is an engine. A power transmission mechanism of the vehicle includes a transmission. The transmission includes an input shaft and an output shaft. The output shaft is closer to the driving wheel than the input shaft is to the driving wheel on the power transmission path. This vehicle has a unit which is configured to detect a relative rotational angle between the input shaft and the output shaft. This relative rotational angle is calculated by integrating a relative rotation speed detected by a sensor. A controller of this vehicle is configured to determine whether a rider has performed an acceleration/deceleration operation. When it is determined that the rider has performed the acceleration/deceleration operation, the controller executes acceleration/deceleration control to accelerate or decelerate the input shaft or the output shaft based on the detected relative rotational angle between the input shaft and the output shaft. Specifically, in the acceleration/deceleration control, an ignition timing is controlled so that at least one of relative speed when the power transmission members make contact with each other or a transmission torque transmitted between the power transmission members is decreased.

CITATION LIST

Patent Literatures

[Patent Literature 1] Japanese Unexamined Patent Publication No. 2011-111133

SUMMARY

The inventors of the subject application thoroughly examined the control such as the control recited in Patent Literature 1, in which the input shaft or the output shaft is accelerated or decelerated based on the detected relative rotational angle between the input shaft and the output shaft. As a result, it was found that shock to the vehicle might occur.

An object of the present teaching is to ensure suppression of the occurrence of shock to a vehicle which includes a plurality of power transmission members on a power transmission path between a driving source and a driving wheel.

The inventors of the subject application thoroughly examined the technology such as the technology recited in Patent Literature 1, by which the input shaft or the output shaft is accelerated or decelerated based on the detected relative rotational angle between the input shaft and the output shaft. As a result, it was found that shock to the vehicle might occur when the engine rotation speed was high. Based on further examination, the inventors assumed that the shock to the vehicle occurred because the control was performed based on the detected relative rotational angle between the input shaft and the output shaft.

According to Patent Literature 1, the acceleration/deceleration control of the input shaft or the output shaft starts when the absolute value of the detected relative rotational angle between the input shaft and the output shaft exceeds a predetermined threshold. In other words, the acceleration/deceleration control is not performed until the absolute value of the relative rotational angle between the input shaft and the output shaft actually exceeds the threshold. In addition, the input shaft is provided to be closer to the driving wheel than the crankshaft is to the driving wheel, on the power transmission path. On this account, a change of the rotation speed of the input shaft is delayed from a change of the rotation speed of the crankshaft (i.e., the engine rotation speed). For this reason, even though the acceleration/deceleration control is performed after the absolute value of the relative rotational angle between the input shaft and the output shaft actually exceeds the threshold, the acceleration/deceleration control may not be able to successfully suppress the occurrence of shock.

In order to more promptly perform the acceleration/deceleration control, the threshold may be decreased. However, there is a limit to such decrease in the threshold, in consideration of the accuracy of the control. Even if the threshold is decreased, because the acceleration/deceleration control is performed after detecting that the absolute value of the relative rotational angle between the input shaft and the output shaft exceeds the threshold, the acceleration/deceleration control may not be able to successfully suppress the occurrence of shock to the vehicle.

Instead of starting the control for suppressing the occurrence of shock to a vehicle after detecting that the absolute value of a relative rotational angle between two shafts on a power transmission path exceeds a threshold, the inventors of the subject application conceived of the following technical idea. The technical idea is to start the control for suppressing the occurrence of shock when detecting a sign that the absolute value of a relative rotational angle between two shafts on a power transmission path will exceed a threshold. In other words, a state in which shock to the vehicle may occur is detected before a predetermined relative rotational angle is detected. This makes it possible to start the control for suppressing the occurrence of shock early as compared to the case where the control for suppressing the occurrence of shock starts after the predetermined relative rotational angle is detected.

In addition to the above, the inventors of the subject application noticed that the direction of the relative movement of two power transmission members neighboring each other on a power transmission path could be discerned based on a driving source torque generated by a driving source. The inventors of the subject application further noticed that, when the relative movement of the power transmission members was discerned based on the driving source torque, a state in which shock to the vehicle may occur was detectable before a predetermined relative rotational angle between two shafts on the power transmission path was detected.

Based on these findings, the inventors of the subject application have conceived of an idea of starting the control for suppressing the occurrence of shock to a vehicle by detecting a state in which shock to the vehicle may occur based on the driving source torque, before the detection of the predetermined relative rotational angle between the two shafts on the power transmission path.

<1> A vehicle of the present teaching includes: a driving source; a driving wheel; power transmission members which are provided on a power transmission path on which power is transmitted between the driving source and the driving wheel; and a driving source torque controller which is configured to control a driving source torque generated by the driving source. The driving source torque controller is able to acquire the driving source torque, and when the driving source torque is controlled to accelerate the driving wheel, the driving source torque controller is configured to suppress shock to the vehicle which occurs when backlash between the power transmission members on the power transmission path is eliminated, by performing shock suppression control to control the driving source torque based on the acquired driving source torque so that at least one of (i) an absolute value of relative speed between the power transmission members on the power transmission path decreases when the backlash between the power transmission members decreases or (ii) a transmission torque transmitted between the power transmission members on the power transmission path decreases when the backlash between the power transmission members is eliminated.

According to this arrangement, the vehicle includes the driving source and the driving wheel. The vehicle further includes the power transmission members which are provided on the power transmission path on which power is transmitted between the driving source and the driving wheel. There is backlash between the power transmission members. On this account, when the driving wheel is accelerated, the backlash between the power transmission members on the power transmission path for acceleration gradually decreases. When the backlash is eliminated, a torque is transmitted between the power transmission members, and the driving wheel starts to be accelerated.

The vehicle includes the driving source torque controller which is configured to control the driving source torque generated by the driving source. The driving source torque controller acquires the driving source torque. The driving source torque controller may acquire the driving source torque by estimation, or may detect the driving source torque by using a sensor. When controlling the driving source torque in order to accelerate the driving wheel, the driving source torque controller performs shock suppression control of controlling the driving source torque based on the acquired driving source torque so that at least one of (i) the absolute value of the relative speed between the power transmission members decreases when the backlash between the power transmission members on the power transmission path decreases or (ii) a transmission torque which is transmitted between the power transmission members decreases when the backlash between the power transmission members on the power transmission path is eliminated. Because the absolute value of the relative speed between the power transmission members when the backlash between the power transmission members decreases is small, the shock to the vehicle, which occurs when the backlash between the power transmission members on the power transmission path is eliminated, is suppressed. Because the transmission torque transmitted between the power transmission members is small when the backlash between the power transmission members is eliminated, the shock to the vehicle, which occurs when the backlash between the power transmission members on the power transmission path is eliminated, is suppressed. As such, the shock suppression control suppresses the shock to the vehicle, which occurs when the backlash between the power transmission members on the power transmission path is eliminated.

As described above, the driving source torque controller performs the shock suppression control of suppressing the occurrence of shock, based on the driving source torque. Because the driving source torque is used, it is possible to discern the direction of the relative movement of the power transmission members. On this account, because the relative movement of the power transmission members is discerned based on the driving source torque, it is possible to detect a state in which shock to the vehicle may occur, without detecting the relative rotational angle or relative rotation speed. Furthermore, because the relative movement of the power transmission members is discerned based on the driving source torque, it is possible to detect a state in which shock to the vehicle may occur, before detecting the relative rotational angle or relative rotation speed. The driving source torque controller of the present teaching is therefore able to start the control for suppressing the occurrence of shock early, as compared to cases where the control for suppressing the occurrence of shock to the vehicle is started after the relative rotational angle or relative rotation speed is detected. As a result, the suppression of the occurrence of shock to the vehicle is further ensured.

<2> According to an aspect of the present teaching, the vehicle of the present teaching preferably includes the following arrangement.

The driving source torque controller determines a timing to start the shock suppression control based on the acquired driving source torque.

With this arrangement, it is possible to start the control for suppressing the occurrence of shock early, as compared to cases where the control for suppressing the occurrence of shock to the vehicle is started after the relative rotational angle or relative rotation speed is detected.

<3> According to an aspect of the present teaching, the vehicle of the present teaching preferably includes the following arrangement.

The driving source torque controller acquires the driving source torque by estimating the driving source torque.

According to this arrangement, it is unnecessary to provide a sensor for detecting the driving source torque in order to acquire the driving source torque.

<4> According to an aspect of the present teaching, the vehicle of the present teaching preferably includes the following arrangement, in addition to the arrangement <3> described above.

The driving source is an engine having a combustion chamber. The vehicle includes: an engine rotation speed sensor which is configured to detect engine rotation speed; a throttle valve which adjusts an amount of air supplied to the combustion chamber; and a throttle sensor which is configured to detect an opening degree of the throttle valve. The driving source torque controller estimates the driving source torque based on a signal from the throttle sensor and a signal from the engine rotation speed sensor.

According to this arrangement, the driving source torque controller estimates the driving source torque based on a signal from the throttle sensor and a signal from the engine rotation speed sensor. Therefore the driving source torque can be estimated relatively accurately. As a result, the suppression of the occurrence of shock to the vehicle is further ensured. A typical vehicle includes a throttle sensor and an engine rotation speed sensor. It is therefore possible to estimate the driving source torque by using the sensors which are typically included in vehicles. In other words, it is unnecessary to provide an additional sensor for shock suppression control.

<5> According to an aspect of the present teaching, the vehicle of the present teaching preferably includes the following arrangement, in addition to the arrangement <3> described above.

The driving source is an engine having a combustion chamber. The vehicle includes: an engine rotation speed sensor which is configured to detect engine rotation speed; a throttle valve which adjusts an amount of air supplied to the combustion chamber; an acceleration operator which is operable to change an opening degree of the throttle valve; and an accelerator sensor configured to detect a degree of movement of the acceleration operator. The driving source torque controller estimates the driving source torque based on a signal from the accelerator sensor and a signal from the engine rotation speed sensor.

According to this arrangement, the driving source torque controller estimates the driving source torque based on a signal from the accelerator sensor and a signal from the engine rotation speed sensor. The opening degree of the throttle valve is changed based on the degree of movement of the acceleration operator detected by the accelerator sensor. Because the driving source torque is estimated based on a signal from the accelerator sensor, a change in the torque can be discerned before an actual change of the driving source torque. This makes it possible to promptly detect a state in which shock to the vehicle may occur. As a result, the suppression of the occurrence of shock to the vehicle is further ensured. A typical vehicle may include an accelerator sensor. It is therefore possible to estimate the driving source torque by using the sensor which is typically included in vehicles. In other words, it is unnecessary to provide an additional sensor for the shock suppression control.

<6> According to an aspect of the present teaching, the vehicle of the present teaching preferably includes the following arrangement, in addition to the arrangement <4> or <5> described above.

The engine includes an ignition device which is configured to ignite an air-fuel mixture of fuel and air in the combustion chamber. The driving source torque controller estimates the driving source torque based on a signal from the throttle sensor or the accelerator sensor, a signal from the engine rotation speed sensor, and an ignition timing of the ignition device.

According to this arrangement, the driving source torque controller estimates the driving source torque based on a signal from the throttle sensor or the accelerator sensor, a signal from the engine rotation speed sensor, and an ignition timing of the ignition device. In this case, the driving source torque is further accurately estimated as compared to cases where a signal from the throttle sensor or the accelerator sensor and a signal from the engine rotation speed sensor are used but an ignition timing is not used for the estimation of the driving source torque. The suppression of the occurrence of shock to the vehicle is therefore further ensured.

<7> According to an aspect of the present teaching, the vehicle of the present teaching preferably includes the following arrangement.

When the driving source torque is controlled to accelerate the driving wheel, during the shock suppression control, the driving source torque controller decreases and then increases the driving source torque so that at least one of (i) the absolute value of the relative speed between the power transmission members on the power transmission path decreases when the backlash between the power transmission members decreases or (ii) the transmission torque transmitted between the power transmission members on the power transmission path decreases when the backlash between the power transmission members is eliminated.

With this arrangement, because the driving source torque is decreased and then increased, the driving torque can be suppressed while the driving source torque is increased, as compared to cases where the shock suppression control is not performed. On this account, at least one of (i) the absolute value of the relative speed between the power transmission members on the deceleration power transmission path decreases while the backlash between the power transmission members decreases or (ii) the transmission torque transmitted between the power transmission members on the deceleration power transmission path decreases when the backlash between the power transmission members is eliminated. This suppresses the shock which occurs when the backlash between the power transmission members is eliminated.

<8> According to an aspect of the present teaching, the vehicle of the present teaching preferably includes the following arrangement.

The driving source torque controller starts the shock suppression control when the acquired driving source torque becomes equal to or larger than a first threshold torque.

When the driving wheel changes from the deceleration state to the acceleration state, the driving source torque increases. When the driving source torque is increasing but small, shock due to the contact between the power transmission members may not occur. The driving source torque controller determines whether the acquired driving source torque becomes not smaller than the first threshold torque. This makes it possible to accurately detect a state in which shock to the vehicle may occur. The driving source torque controller performs the shock suppression control when the driving source torque becomes not smaller than the first threshold torque. It is therefore possible to further ensure not to perform the shock suppression control in a state in which shock to the vehicle does not occur.

<9> According to an aspect of the present teaching, the vehicle of the present teaching preferably includes the following arrangement.

The driving source torque controller calculates a time integrated value of the acquired driving source torque from a point of time where the driving source torque becomes equal to or larger than a second threshold torque, and starts the shock suppression control when the time integrated value becomes equal to or larger than a threshold value.

A point of time when the driving source torque acquired by the driving source torque controller becomes equal to or larger than the second threshold torque is set as a reference time point. The driving source torque controller calculates a time integrated value of the acquired driving source torque from the reference time point. The driving source torque controller determines whether the integrated value becomes not smaller than a threshold value. This makes it possible to further accurately detect a state in which shock to the vehicle may occur. The driving source torque controller performs the shock suppression control when the integrated value becomes not smaller than the threshold value. It is therefore possible to further ensure not to perform the shock suppression control in a state in which shock to the vehicle does not occur.

<10> According to an aspect of the present teaching, the vehicle of the present teaching preferably includes the following arrangement.

The driving source torque controller determines a timing to terminate the shock suppression control based on an elapsed time.

According to the arrangement above, the driving source torque controller determines a timing to terminate the shock suppression control based on an elapsed time. To be more specific, for example, a timing to terminate the shock suppression control may be determined based on the elapsed time from the start of the shock suppression control. Alternatively, for example, a timing to terminate the shock suppression control may be determined based on the elapsed time from a point of time where the acquired driving source torque becomes equal to or larger than a predetermined value after the start of the shock suppression control. After some time elapses from the start of the shock suppression control, it is assumed that power is being transmitted between the power transmission members. For this reason, because the timing to terminate the shock suppression control is determined based on the elapsed time, it is possible to reliably perform the shock suppression control when the power transmission members make contact with each other. Furthermore, it is possible to prevent the shock suppression control from being performed for an unnecessarily long time.

<11> According to an aspect of the present teaching, the vehicle of the present teaching preferably includes the following arrangement.

The vehicle includes a driving source rotation speed sensor which is configured to detect rotation speed of the driving source. After the shock suppression control is started, the driving source torque controller determines a timing to terminate the shock suppression control based on a signal from the driving source rotation speed sensor.

According to the arrangement above, the driving source torque controller determines a timing to terminate the shock suppression control based on a signal from the driving source rotation speed sensor which is configured to detect the rotation speed of the driving source. The rotation speed of the driving source may increase until the backlash between the power transmission members on the accelera-tion power transmission path is eliminated. The rotation speed of the driving source may temporarily decrease after the backlash between the power transmission members on the acceleration power transmission path is eliminated.

By utilizing these phenomena, it is possible to determine the timing to terminate the shock suppression control. Because the timing to terminate the shock suppression control is determined based on the rotation speed of the driving source, it is possible to reliably perform the shock suppression control when the power transmission members make contact with each other. Furthermore, it is possible to prevent the shock suppression control from being performed for an unnecessarily long time.

<12> According to an aspect of the present teaching, the vehicle of the present teaching preferably includes the following arrangement.

The vehicle includes: an input shaft which is provided on the power transmission path; and an output shaft which is provided on the power transmission path and between the input shaft and the driving wheel. The driving source torque controller is configured to detect a relative rotational angle between the input shaft and the output shaft. After the shock suppression control is started, the driving source torque controller determines a timing to terminate the shock suppression control based on the detected relative rotational angle between the input shaft and the output shaft.

According to the arrangement above, the driving source torque controller detects the relative rotational angle between the input shaft and the output shaft of the power transmission mechanism. Based on the detected relative rotational angle between the input shaft and the output shaft, the driving source torque controller determines a timing to terminate the shock suppression control. When the driving wheel changes from the deceleration state to the acceleration state, the relative rotational angle between the input shaft and the output shaft changes. Based on the relative rotational angle between the input shaft and the output shaft, it is possible to estimate whether power is being transmitted between the power transmission members. For this reason, because the timing to terminate the shock suppression control is determined based on the relative rotational angle between the input shaft and the output shaft, it is possible to reliably perform the shock suppression control when the power transmission members make contact with each other. Furthermore, it is possible to prevent the shock suppression control from being performed for an unnecessarily long time.

<13> According to an aspect of the present teaching, the vehicle of the present teaching preferably includes the following arrangement.

The driving source torque controller is able to detect a state in which power cannot be transmitted between the driving source and the driving wheel. After the shock suppression control is started, the driving source torque controller terminates the shock suppression control in response to detecting the state in which power cannot be transmitted between the driving source and the driving wheel.

According to the arrangement above, the driving source torque controller is able to detect a state in which power cannot be transmitted between the driving source and the driving wheel. A state in which power cannot be transmitted between the driving source and the driving wheel is, for example, a state in which the clutch is switched to the cut-off state to change the gear position of the transmission. In the state in which power cannot be transmitted between the driving source and the driving wheel, significant shock is unlikely to occur even if the power transmission members make contact with each other. The shock suppression control is therefore unnecessary. The driving source torque controller terminates the shock suppression control when the state in which power cannot be transmitted between the driving source and the driving wheel is detected. It is therefore possible to prevent the shock suppression control from being performed for an unnecessarily long time.

<14> According to an aspect of the present teaching, the vehicle of the present teaching preferably includes the following arrangement.

The driving source is an engine having a combustion chamber. The vehicle includes a transmission which has selectable gear positions. The driving source torque controller is configured to acquire a current gear position of the transmission. In response to a request to change the gear position of the transmission or to detection of a change in the gear position of the transmission, the driving source torque controller terminates the shock suppression control.

When the gear position of the transmission is changed, the power transmission path and the power transmission members on the power transmission path may be changed, too. For this reason, even if the shock suppression control performed before the change of the gear position is continued, the shock due to the contact between the power transmission members on the power transmission path after the change of the gear position may not be suppressed. Meanwhile, the shock suppression control may not be necessary after the change of the gear position because no shock may occur due to the contact between the power transmission members on the power transmission path after the change of the gear position. The driving source torque controller terminates the shock suppression control when a request to change the gear position of the transmission is made or a change of the gear position of the transmission is detected. It is therefore possible to prevent the shock suppression control from being unnecessarily performed.

<15> According to an aspect of the present teaching, the vehicle of the present teaching preferably includes the following arrangement.

The driving source is an engine having a combustion chamber. The vehicle includes a transmission which includes an input shaft provided on the power transmission path and an output shaft which is provided on the power transmission path and between the input shaft and the driving wheel. The transmission has selectable gear positions which are different in a ratio of rotation speed of the input shaft to rotation speed of the output shaft. The driving source torque controller is configured to determine whether a blipping operation is performed, the blipping operation temporarily increasing the driving source torque in response to a gear position being changed to increase the ratio of the rotation speed of the input shaft to the rotation speed of the output shaft. In response to determining that the blipping operation is performed, the driving source torque controller does not perform the shock suppression control.

A change of the gear position to increase the ratio of the rotation speed of the output shaft to the rotation speed of the input shaft is termed down shift. The blipping operation is an operation to temporarily increase the driving source torque during down shift in order to smoothly perform the down shift. When the shock suppression control is performed during the blipping operation, the driving source torque which is supposed to increase due to the blipping operation does not increase. Therefore smooth down shift may not be achieved even though the blipping operation is performed. The driving source torque controller does not perform the shock suppression control when it is determined that the blipping operation has been performed. Therefore smooth down shift by the blipping operation can be achieved.

<16> According to an aspect of the present teaching, the vehicle of the present teaching preferably includes the following arrangement.

The driving source torque controller includes the driving source torque sensor which is configured to detect the driving source torque.

With this arrangement, the driving source torque controller is able to further accurately acquire the torque as compared to cases where the driving source torque is estimated.

Definitions of Terms

In the present teaching, the term "shock" indicates a physical and discrete vibration. To put it differently, the term indicates a non-continuous vibration. The "shock" is at a level where a passenger feels uncomfortable.

In the present teaching, a sentence "backlash between a plurality of power transmission members on a power transmission path is decreasing" "when a driving source torque is controlled to accelerate a driving wheel" indicates that the backlash between the power transmission members on the power transmission path for accelerating the driving wheel is decreasing. In the present teaching, a sentence "backlash between a plurality of power transmission members on a power transmission path is eliminated" "when a driving source torque is controlled to accelerate a driving wheel" indicates that the backlash between the power transmission members on the power transmission path for accelerating the driving wheel is eliminated.

In the present teaching, a phrase "relative speed between a plurality of power transmission members" indicates relative speed between two power transmission members. The relative speed may be the speed of one of the two power transmission members closer to a driving source on a power transmission path relative to the other one of the power transmission members, or vice versa. In either case, "absolute value of relative speed of a plurality of power transmission members" is the same.

In the present teaching, "a transmission torque transmitted between a plurality of power transmission members when backlash between the power transmission members on a power transmission path is eliminated" "when a driving source torque is controlled to accelerate a driving wheel" is always a positive torque. To be more specific, a positive transmission torque is transmitted from one of two power transmission members closer to a driving source on a power transmission path to the other one of the two power transmission members.

In the present teaching, a sentence "the absolute value of the relative speed between a plurality of power transmission members decreases when backlash between the power transmission members on a power transmission path decreases" indicates that the absolute value of the relative speed between the power transmission members decreases when the backlash between the power transmission members on the power transmission path decreases, as compared to cases where shock suppression control is not performed. In the present teaching, a sentence "a transmission torque transmitted between a plurality of power transmission members when backlash between the power transmission members on a power transmission path is eliminated decreases" indicates that the transmission torque transmitted between the power transmission members when the backlash between the power transmission members on the power transmission path is eliminated decreases, as compared to cases where the shock suppression control is not performed.

In the present teaching, a phrase "a state in which power cannot be transmitted between a driving source and a driving wheel" indicates, for example, a case where a transmission is in a neutral position or a case where a clutch is in a cut-off state.

In the present teaching, a phrase "a driving source torque becomes equal to or larger than a first threshold torque" indicates that the driving source torque increases from a value smaller than the first threshold torque to a value equal to or larger than the first threshold torque. This definition is applicable to a phrase "when a driving source torque becomes equal to or larger than a second threshold torque".

In this specification, when something (e.g., control) is done "based on A", it may be done solely based on A or may be done based on A and something different from A.

In the present specification, an end portion of a member indicates a portion constituted by an end and its surroundings of the member.

In this specification, when something is rotatable, it is rotatable 360 degrees or more, unless otherwise specified. In this specification, when something is swingable, it is rotatable less than 360 degrees, unless otherwise specified. The term "rotation" indicates both rotation for 360 degrees and rotation for less than 360 degrees.

In this specification, an expression "entities A and B are lined up in an X direction" indicates the following state. Even when the entities A and B are viewed in any direction orthogonal to the X direction, a linear line or a curved line indicating the X direction passes both the entities A and B. When the entirety of an entity A is lined up with an entity B in the X direction, the entirety of the entity A opposes the entity B in the X direction. In other words, the entirety of the entity A overlaps the entity B when viewed in the X direction. The term "entirety" may be replaced with a term "part". The entities A and B may be in contact with each other. The entities A and B may not be in contact with each other. An entity C may be provided between the entities A and B.

In this specification, an expression "an entity A is provided forward of an entity B" indicates the following state. The entity A is provided in front of a plane which passes the front-most end of the entity B and is orthogonal to the front-rear direction. In this connection, the entities A and B may or may not be lined up in the front-rear direction. The same applies to expressions "an entity A is provided rearward of an entity B", "an entity A is provided above or below an entity B", and "an entity A is provided rightward of or leftward of an entity B".

In this specification, at least one of plural options encompasses all conceivable combinations of the options. At least one of plural options may be one of the options, some of the options, or all of the options. For example, at least one of A, B, or C indicates only A, only B, only C, A and B, A and C, B and C, or A, B, and C.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs. Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement of <1>. In this specification, the term "may" is non-exclusive. The term "may" indicates "may but not must". In this specification, an arrangement which is explained by using the term "may" exerts at least the above-described effects of the arrangement of <1>.

In the present teaching, the preferred arrangements of the different aspects described above may be variously combined. Before an embodiment of the present teaching is detailed, it is observed that the present teaching is not limited to the configurations and layout of elements described below and/or shown in drawings. The present teaching may be implemented as an embodiment other than the below-described embodiment. The present teaching may be implemented as an embodiment other than the below-described embodiment. Furthermore, the present teaching may be implemented by suitably combining below-described modifications.

Advantageous Effects

As described above, according to the present teaching, it is possible to ensure suppression of the occurrence of shock to a vehicle which includes a plurality of power transmission members on a power transmission path between a driving source and a driving wheel.

BRIEF DESCRIPTION OF THE DRAWINGS

FIG. 7A to FIG. 7E are graphs for explaining shock suppression control for the motorcycle shown in FIG. 2. FIG. 7A indicates a throttle opening degree and an accelerator operation degree, FIG. 7B indicates a driving source torque, FIG. 7C indicates an engine rotation speed, FIG. 7D indicates a relative rotational angle between an input shaft and an output shaft, and FIG. 7E indicates the rotation speed of a driving wheel.

DETAILED DESCRIPTION

<Embodiment of Present Teaching>

Figure 1:
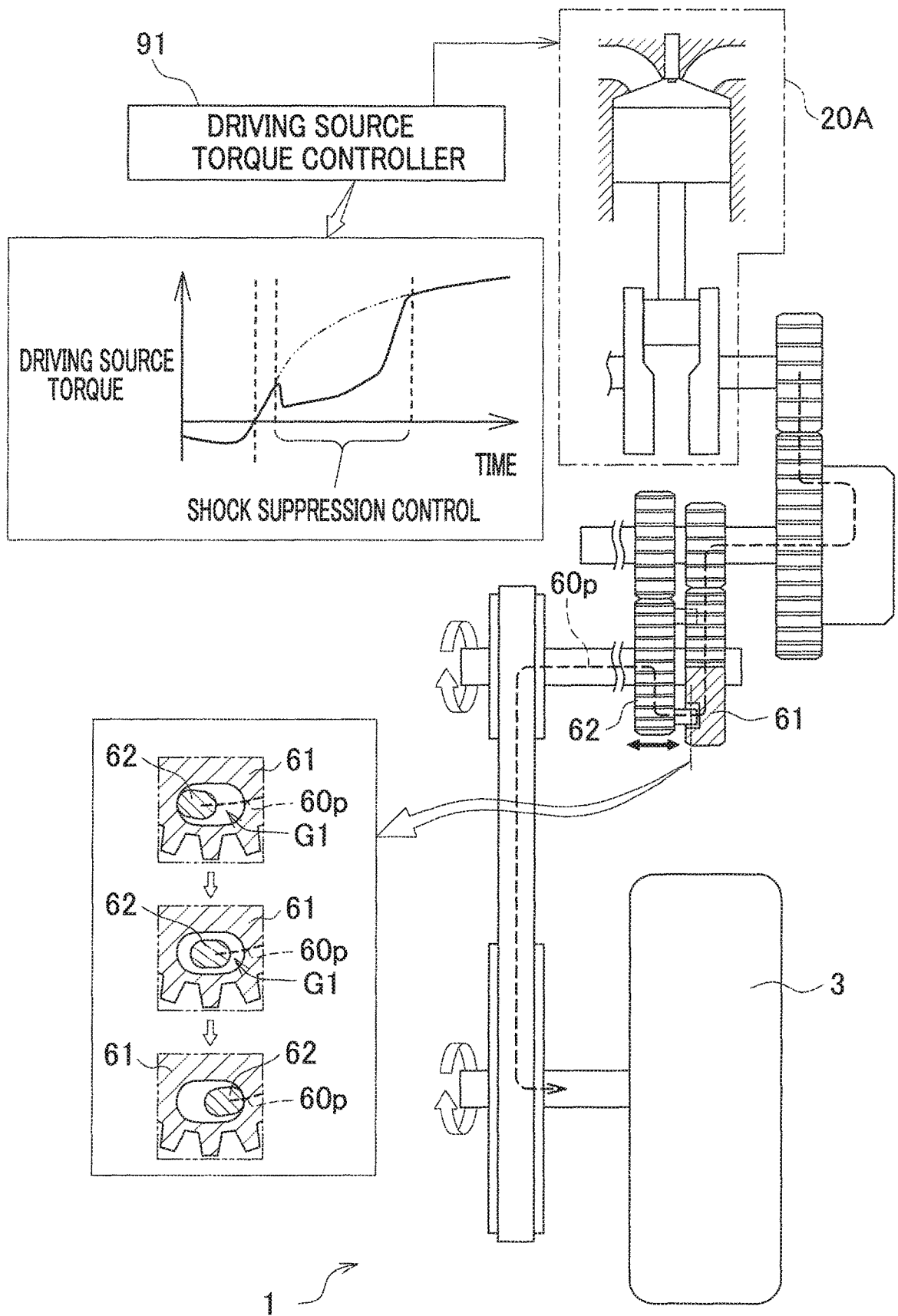
FIG. 1 illustrates the structure of a vehicle of an embodiment of the present teaching.

The following will describe a vehicle 1 of an embodiment of the present teaching with reference to FIG. 1.

The vehicle 1 includes a driving source 20A and a driving wheel 3. The vehicle 1 further includes a plurality of power transmission members 61 and 62 which are provided on a power transmission path 60p on which power is transmitted between the driving source 20A and the driving wheel 3. Power transmission members other than the power transmission members 61 and 62 are also provided on the power transmission path 60p. There is backlash between the power transmission members 61 and 62. On this account, when the driving wheel 3 is accelerated, the backlash G1 between the power transmission members 61 and 62 gradually decreases on the power transmission path 60p for acceleration. After the backlash G1 is eliminated, a torque is transmitted between the power transmission members 61 and 62, and the driving wheel 3 starts to be accelerated.

The vehicle 1 includes a driving source torque controller 91 which is configured to control a driving source torque generated by the driving source 20A. The driving source torque controller 91 acquires the driving source torque. The driving source torque controller 91 may acquire the driving source torque by estimation, or may detect the driving source torque by using a sensor. When controlling the driving source torque in order to accelerate the driving wheel 3, the driving source torque controller 91 performs shock suppression control of controlling the driving source torque based on the acquired driving source torque so that at least one of (i) the absolute value of the relative speed between the power transmission members 61 and 62 decreases when the backlash G1 between the power transmission members 61 and 62 on the power transmission path 60p or (ii) a transmission torque which is transmitted between the power transmission members 61 and 62 decreases when the backlash G1 between the power transmission members 61 and 62 on the power transmission path 60p is eliminated. Because the absolute value of the relative speed between the power transmission members 61 and 62 when the backlash between the power transmission members 61 and 62 decreases is small, the shock to the vehicle 1, which occurs when the backlash between the power transmission members 61 and 62 on the power transmission path 60p is eliminated, is suppressed. Because the transmission torque transmitted between the power transmission members 61 and 62 is small when the backlash between the power transmission members 61 and 62 is eliminated, the shock to the vehicle 1, which occurs when the backlash between the power transmission members 61 and 62 on the power transmission path 60p is eliminated, is suppressed. As such, the shock suppression control suppresses the shock to the vehicle 1, which occurs when the backlash G1 between the power transmission members 61 and 62 on the power transmission path 60p is eliminated.

As described above, the driving source torque controller 91 performs the shock suppression control of suppressing the occurrence of shock, based on the driving source torque. Because the driving source torque is used, it is possible to discern the direction of the relative movement of the power transmission members 61 and 62. On this account, because the relative movement of the power transmission members 61 and 62 is discerned based on the driving source torque, it is possible to detect a state in which shock to the vehicle 1 may occur, without detecting the relative rotational angle or relative rotation speed. Furthermore, because the relative movement of the power transmission members 61 and 62 is discerned based on the driving source torque, it is possible to detect a state in which shock to the vehicle 1 may occur, before detecting the relative rotational angle or relative rotation speed. The driving source torque controller 91 of the present teaching is therefore able to start the control for suppressing the occurrence of shock early, as compared to cases where the control for suppressing the occurrence of shock to the vehicle 1 is performed after the relative rotational angle or relative rotation speed is detected. As a result, the suppression of the occurrence of shock to the vehicle 1 is further ensured.

<Specific Example of Embodiment of Present Teaching>

A specific example of the above-described embodiment of the present teaching will be described with reference to FIGS. 2 to 7. Basically, the specific example of the embodiment encompasses all features of the embodiment of the present teaching described above. Members identical with those in the above-described embodiment of the present teaching are not explained again. The specific example of the embodiment is an example of applying the vehicle of the present teaching to a motorcycle.

Hereinafter, a front-rear direction is a vehicle front-rear direction unless otherwise specified. Hereinafter, a left-right direction is a vehicle left-right direction unless otherwise specified. Hereinafter, an up-down direction is a vehicle up-down direction unless otherwise specified. The vehicle up-down direction is an up-down direction when the vehicle vertically stands up on a horizontal road surface. The vehicle left-right direction and the vehicle front-rear direction are directions viewed by a driver seated on the vehicle in the above-described state. The vehicle left-right direction is identical to a vehicle width direction. The reference symbols F and Re shown in FIG. 2 and FIG. 3 indicate a vehicle forward direction and a vehicle rearward direction, respectively. The reference symbols U and D shown in FIG. 2 indicate a vehicle upward direction and a vehicle downward direction, respectively. The reference symbols L and Ri shown in FIG. 3 indicate a vehicle leftward direction and a vehicle rightward direction, respectively. The descriptions below basically presuppose that the vehicle is provided on a horizontal road surface.

<1> Overall Structure of Motorcycle

Figure 2:
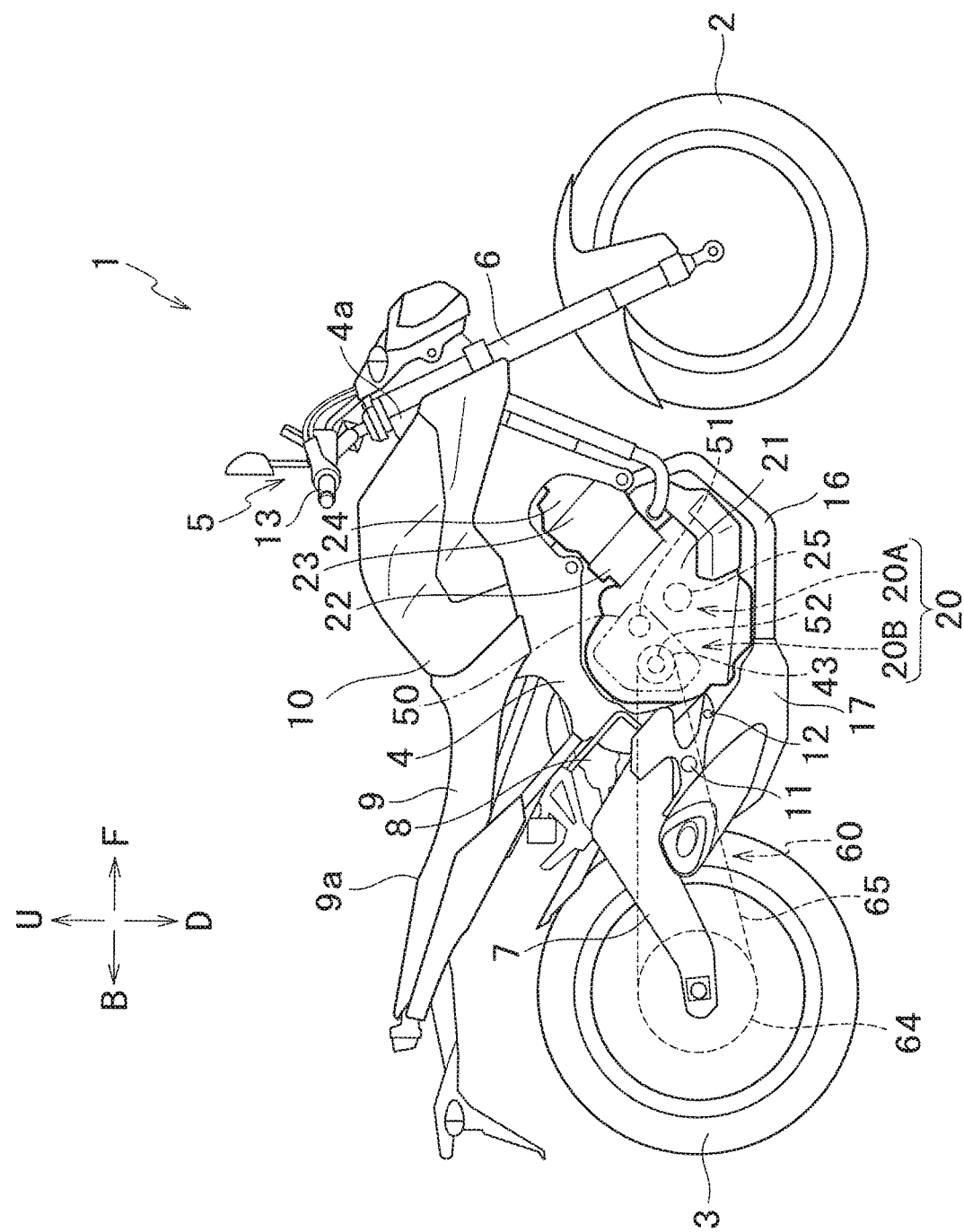
FIG. 2 is a right side view of a motorcycle of a specific example of the embodiment of the present teaching.

As shown in FIG. 2, the motorcycle 1 includes a front wheel 2, a rear wheel 3, and a vehicle body frame 4. The vehicle body frame 4 includes a head pipe 4a at a front portion. A steering shaft (not illustrated) is rotatably inserted into the head pipe 4a. An upper end portion of the steering shaft is connected to a handle unit 5. An upper end portion of a pair of front forks 6 is fixed to the handle unit 5. The lower end portions of the pair of front forks 6 support the front wheel 2. The front wheel 2 includes a tire and a wheel.

The vehicle body frame 4 swingably supports a front end portion of a pair of swingarms 7. The rear end portions of the paired swingarms 7 support the rear wheel 3. The rear wheel 3 includes a tire and a wheel. Each swingarm 7 is connected, at a portion rearward of the swing center, to the vehicle body frame 4 via a rear suspension 8.

As shown in FIG. 2, the vehicle body frame 4 supports a seat 9 and a fuel tank 10. The seat 9 is a part on which a rider (e.g., driver) sits, and does not include a part on which a rider's waist or back leans. The seat 9 does not include a part on which the tandem rider (e.g., passenger) sits.

The vehicle body frame 4 supports the engine unit 20. The engine unit 20 is provided below the upper end 9a of the seat 9. At least part of the engine unit 20 is lined up with at least part of the seat 9 in the up-down direction. When viewed in the leftward direction or rightward direction, the engine unit 20 is provided rearward of the front wheel 2 and forward of the rear wheel 3. The vehicle body frame 4 supports a battery (not illustrated).

The battery supplies electric power to electronic devices such as an ECU 90 and sensors which will be described later.

The motorcycle 1 includes footrests 11 at lower left and right portions. The footrests 11 are provided to allow the rider to place his/her feet thereon. A brake pedal 12 is provided substantially directly in front of the right footrest 11. As the rider operates the brake pedal 12 by a foot, a rear braking device (not illustrated) is operated and the rear wheel 3 is braked. A shift pedal which is not illustrated is provided substantially directly in front of the left footrest 11. This shift pedal is operated when the gear position of a later-described transmission 50 (see FIG. 3) is changed. Alternatively, a shift switch may be provided on the handle unit 5 in place of the shift pedal.

Various types of switches operated by the rider are provided on the handle unit 5. An accelerator grip 13, a brake lever (not illustrated), and a clutch lever (not illustrated) are provided on the handle unit 5. These members are operated by the hands of the rider.

The accelerator grip 13 is operated to adjust a driving source torque generated by the engine unit 20. The accelerator grip 13 is operated by rotation. Basically, the driving source torque increases as the degree of movement (rotation amount) of the accelerator grip 13 increases. The accelerator grip 13 is equivalent to an acceleration operator of the present teaching. As the brake lever is operated, a front braking device (not illustrated) is driven and the front wheel 2 is braked. As shown in FIG. 4, the motorcycle 1 includes an accelerator sensor 72 which is configured to detect the degree of movement of the accelerator grip 13. The clutch lever is operated to switch a later-describe clutch 42 (see FIG. 3) between a connection state and a cut-off state. As shown in FIG. 4, the motorcycle 1 includes a clutch sensor 73 which is configured to detect the degree of movement of the clutch lever.

The motorcycle 1 further includes a wheel speed sensor (not illustrated) which is configured to detect the rotation speed of the rear wheel 3 or the front wheel 2. The motorcycle 1 may include both a wheel speed sensor configured to detect the rotation speed of the rear wheel 3 and a wheel speed sensor configured to detect the rotation speed of the front wheel 2. A later-described ECU 90 is configured to detect the vehicle speed of the motorcycle 1 based on a signal from the wheel speed sensor.

<2> Structure of Engine Unit

Figure 3:
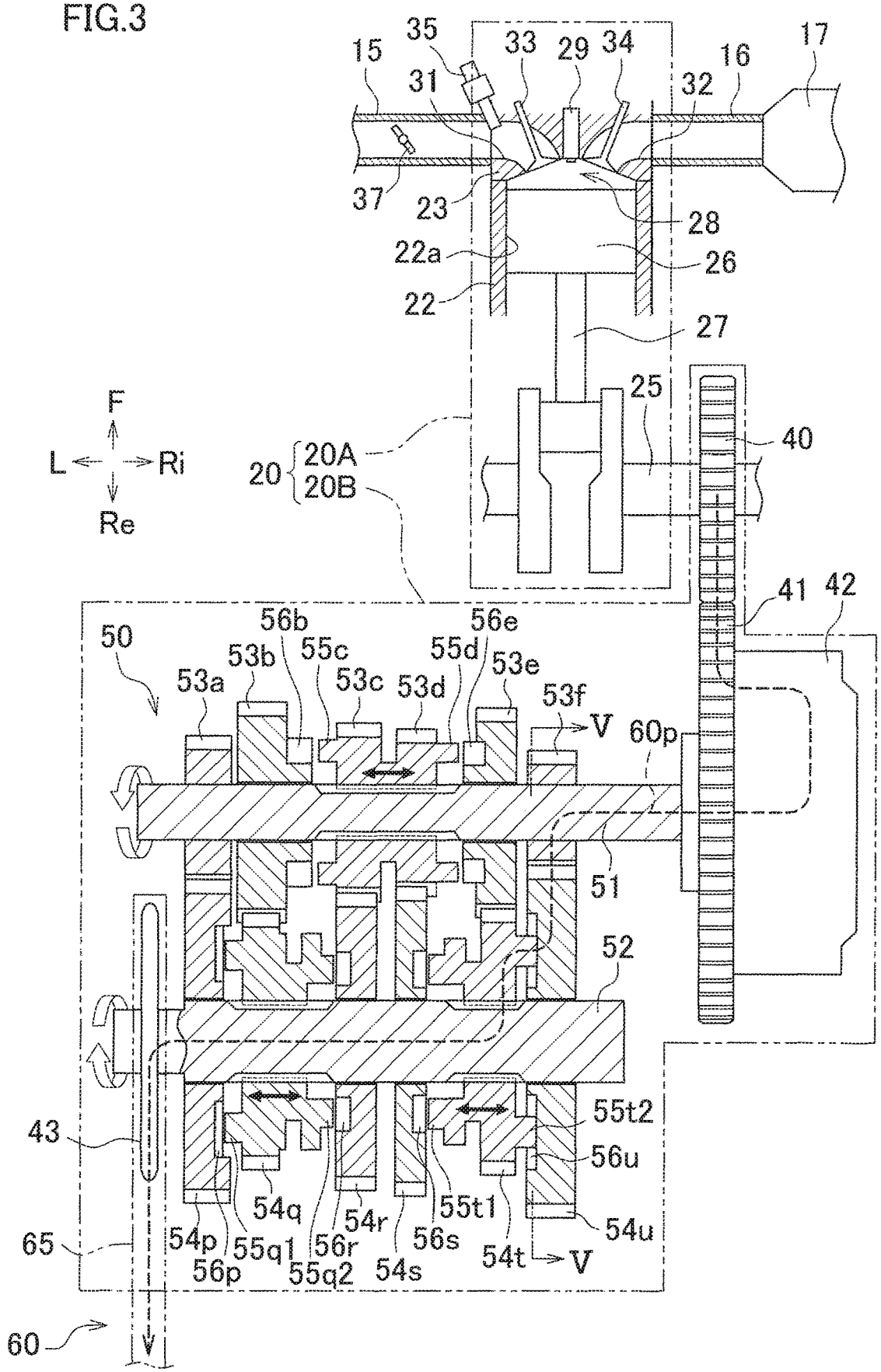
FIG. 3 is a schematic cross section of an engine unit and a power transmission mechanism of the motorcycle shown in FIG. 2.
Figure 4:
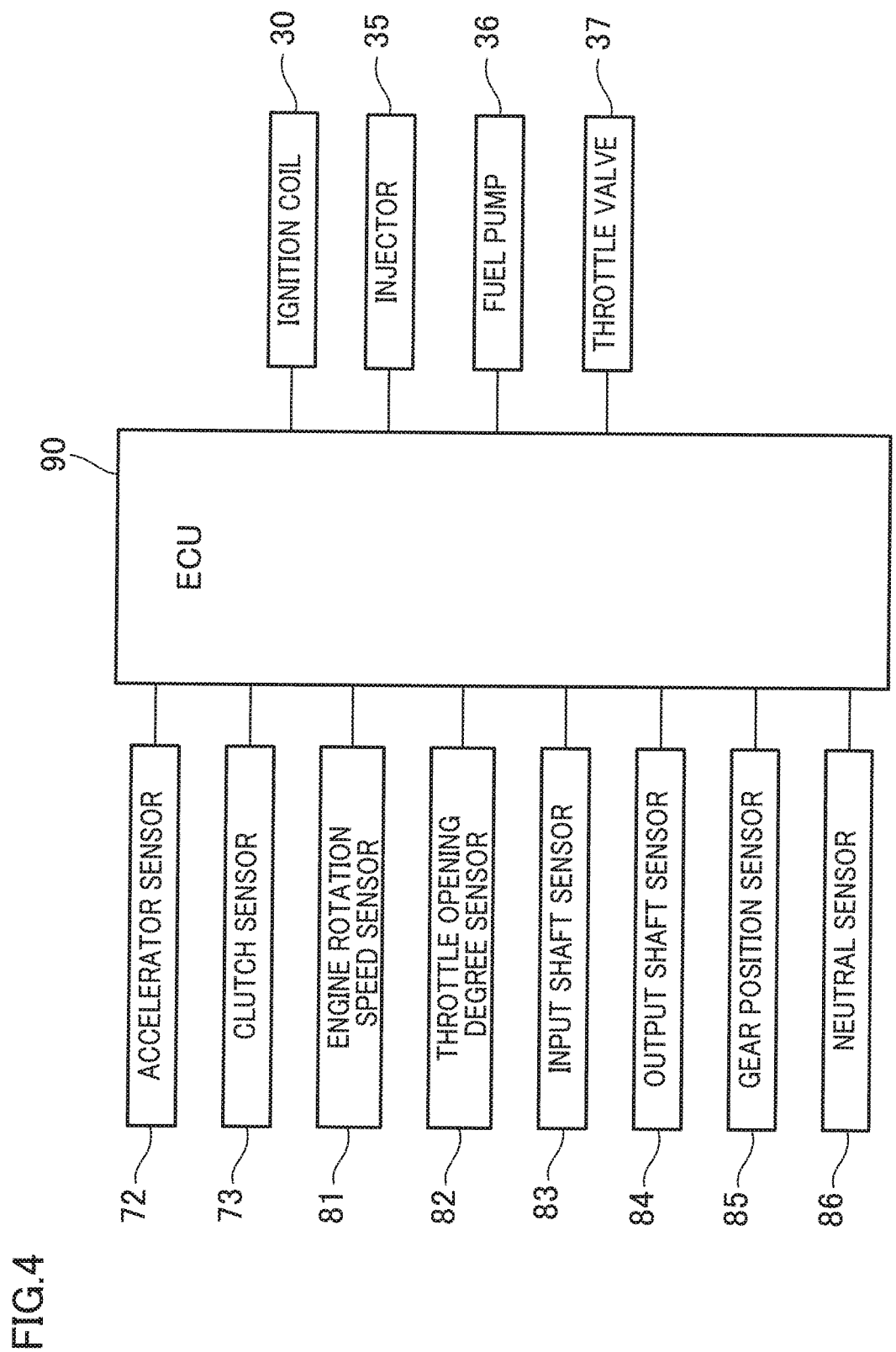
FIG. 4 is a control block diagram of the motorcycle shown in FIG. 2.

As shown in FIG. 3, the engine unit 20 includes an engine 20A and a power transmission unit 20B. The engine 20A (driving source) generates a driving source torque. The driving source torque generated by the engine 20A is transmitted to the power transmission unit 20B.

As shown in FIG. 2, the engine unit 20 includes a crankcase 21, a cylinder body 22, a cylinder head 23, and a head cover 24. The cylinder body 22 is attached to an upper end portion of the crankcase 21. The cylinder head 23 is attached to an upper end portion of the cylinder body 22. The head cover 24 is attached to an upper end portion of the cylinder head 23. The crankcase 21 is formed by combining a plurality of components. The cylinder body 22, the cylinder head 23, and the head cover 24 are different members. Alternatively, two or three of the cylinder body 22, the cylinder head 23, and the head cover 24 may be integrally formed.

<2-1> Structure of Engine The engine 20A is a gasoline engine. The engine unit 20 is a four-stroke type engine. The engine 20A is a single-cylinder engine. The four-stroke engine repeats, in each cylinder, an intake process, a compression process, a combustion process (expansion process), and an exhaust process in this order. The combustion process in the three-cylinder engine is performed at different timings in the respective three cylinders.

As shown in FIG. 2 and FIG. 3, the engine 20A includes a crankshaft 25. As shown in FIG. 2, the crankshaft 25 is housed in the crankcase 21. As shown in FIG. 4, the motorcycle 1 includes an engine rotation speed sensor 81. The engine rotation speed sensor 81 detects the rotation speed of the crankshaft 25, i.e., the engine rotation speed. To be more specific, the engine rotation speed sensor 81 detects the number of rotations of the crankshaft 25 per unit time. The engine rotation speed sensor 81 is equivalent to a driving source rotation speed sensor of the present teaching.

Although not illustrated, the crankshaft 25 is connected to a starter motor and a generator. The starter motor and the generator are housed in the crankcase 21. The starter motor is driven by power from a battery. The starter motor rotates the crankshaft 25 at the start of the engine 20A. The generator generates electric power by the power (rotational force) of the crankshaft 25. The battery is charged with the electric power generated by the generator. The starter motor and the generator may be integrated.

As shown in FIG. 3, the cylinder body 22 includes a cylinder hole 22a. A piston 26 is slidably housed in the cylinder hole 22a. The piston 26 is connected to the crankshaft 25 via a connecting rod 27 (see FIG. 3). The engine 20A includes a combustion chamber 28. The combustion chamber 28 is formed by the lower surface of the cylinder head 23, the cylinder hole 22a, and the piston 26. The engine 20A includes an ignition plug 29. A leading end portion of the ignition plug 29 is provided inside the combustion chamber 28. The ignition plug 29 is configured to ignite an air-fuel mixture of fuel and air in the combustion chamber 28. The ignition plug 29 is equivalent to an ignition device of the present teaching. The ignition plug 29 is connected to an ignition coil 30 shown in FIG. 4. The ignition coil 30 stores electric power to cause spark discharge of the ignition plug 29. The ignition coil 30 controls an ignition timing of the ignition plug 29. As the air-fuel mixture in the combustion chamber 28 is ignited and combusted, the piston 26 reciprocates. As a result, a driving source torque is generated in the crankshaft 25.

As shown in FIG. 3, the combustion chamber 28 is connected to an intake passage 31 and an exhaust passage 32 which are formed in the cylinder head 23. The intake passage 31 and the exhaust passage 32 are spaces. The intake passage 31 is opened and closed by an intake valve 33. The exhaust passage 32 is opened and closed by an exhaust valve 34. The intake valve 33 and the exhaust valve 34 are driven by a valve driving device (not illustrated). The valve driving device is housed in the cylinder head 23. The valve driving device operates in sync with the crankshaft 25.

As shown in FIG. 3, the intake passage 31 is connected to an intake pipe 15. The atmospheric air is supplied to the combustion chamber 28 through the intake pipe 15 and the intake passage 31. A leading end portion of an injector 35 is provided in the intake passage 31 or the intake pipe 15. The injector 35 is configured to inject fuel in the intake passage 31 or the intake pipe 15. The injector 35 is a fuel supplier that supplies fuel to the combustion chamber 28. The injector 35 is connected to a fuel pump 36 shown in FIG. 4 through a fuel hose. The fuel pump 36 is provided in the fuel tank 10. The fuel in the fuel tank 10 is pressure-fed to the injector 35 by the fuel pump 36. Alternatively, the injector 35 may be positioned to inject fuel in the combustion chamber 28. Alternatively, a carburetor may be used as the fuel supplier in place of the injector 35. The carburetor utilizes a negative pressure in the combustion chamber 28 to supply fuel into the combustion chamber 28.

A throttle valve 37 is provided in the intake pipe 15. The throttle valve 37 adjusts an amount of air supplied to the combustion chamber 28. The opening degree of the throttle valve 37 is changed as the rider operates the accelerator grip 13. The throttle valve 37 is electronically controlled. In other words, the later-described ECU 90 controls the opening degree of the throttle valve 37 based on a signal from the accelerator sensor 72. As shown in FIG. 4, the motorcycle 1 includes a throttle opening degree sensor 82 (throttle sensor). The throttle opening degree sensor 82 is configured to detect the opening degree of the throttle valve 37 by detecting the position of the throttle valve 37. Hereinafter, the opening degree of the throttle valve 37 will be referred to as a throttle opening degree.

As shown in FIG. 3, the exhaust passage 32 is connected to an exhaust pipe 16. As shown in FIG. 2 and FIG. 3, the exhaust pipe 16 is connected to a muffler 17. A catalyst (not illustrated) by which exhaust gas is purified is provided in the muffler 17. Combustion gas (exhaust gas) generated in the combustion chamber 28 during the combustion process is exhausted to the exhaust passage 32. The exhaust gas is then exhausted to the atmosphere through the exhaust pipe 16 and the muffler 17.

<3> Structure of Power Transmission Mechanism

As shown in FIG. 2 and FIG. 3, the motorcycle 1 includes a power transmission mechanism 60. The power transmission mechanism 60 includes the power transmission unit 20B of the engine unit 20, a chain 65, and a driven sprocket 64. The power transmission mechanism 60 is capable of transmitting the driving source torque generated by the engine 20A (to be more specific, the crankshaft 25) to the rear wheel 3. In the following descriptions, the rear wheel 3 may be referred to as a driving wheel 3. The power transmission mechanism 60 is configured to transmit power between the engine 20A and the driving wheel 3. The power transmission mechanism 60 includes a power transmission path 60p which is from the engine 20A to the driving wheel 3. In other words, power transmitted between the engine 20A and the driving wheel 3 is transmitted on the power transmission path 60p.

As shown in FIG. 3, the power transmission unit 20B includes a drive gear 40, a driven gear 41, the clutch 42, the transmission 50, and a drive sprocket 43. The drive gear 40, the driven gear 41, the clutch 42, and the transmission 50 are housed in the crankcase 21. The drive sprocket 43 is provided outside (to the left of) the crankcase 21. It is noted that FIG. 3 is not a cross section cut along a single plane. FIG. 3 is a cross section passing the crankshaft 25, the input shaft 51, and the output shaft 52. In FIG. 3, however, the crankshaft 25 is not shown in cross section but shown in profile.

The drive gear 40 is attached to the crankshaft 25 to be rotatable together with the crankshaft 25. The transmission 50 includes an input shaft 51 and an output shaft 52. The input shaft 51 and the output shaft 52 are provided on the power transmission path 60p. The output shaft 52 is provided between the input shaft 51 and the driving wheel 3 on the power transmission path 60p. The driven gear 41 is attached to the input shaft 51 to be relatively rotatable. The driven gear 41 is engaged with the drive gear 40.

The clutch 42 is provided at an end portion of the input shaft 51. The clutch 42 is connected to the driven gear 41, and receives power from the driven gear 41. The clutch 42 is switchable between the connection state and the cut-off state. The connection state is a state in which power transmitted from the driven gear 41 is transmittable to the input shaft 51. In other words, in the connection state, the power of the crankshaft 25 is transmittable to the input shaft 51. The cut-off state is a state in which power transmitted from the driven gear 41 is not transmittable to the input shaft 51. In other words, in the cut-off state, the power of the crankshaft 25 is not transmittable to the input shaft 51. In accordance with the degree of movement of the clutch lever (not illustrated), the clutch 42 is controlled to be in the connection state or the cut-off state. The clutch 42 is controlled by the ECU 90 based on a signal from the clutch sensor 73. Instead of providing the clutch sensor 73, the clutch 42 may be connected to the clutch lever by wire. When the degree of movement of the clutch lever falls within a predetermined range which is larger than zero and smaller than the maximum degree, the clutch 42 is in a half clutch state. When the clutch 42 is in the half clutch state, the power of the crankshaft 25 is partially transmitted to the input shaft 51. The clutch 42 is a typical clutch such as a friction clutch. The structure of the clutch 42 is not detailed.

The transmission 50 is arranged to be able to transmit the power of the input shaft 51 to the output shaft 52. The ratio of the rotational speed of the input shaft 51 to the rotation speed of the output shaft 52 is termed a transmission ratio. The transmission 50 is configured to be able to change the transmission ratio. The transmission 50 has plural selectable gear positions which are different in transmission ratio. The transmission 50 is a sequential shift transmission. In the sequential shift transmission, the gear position is changeable only to a neighboring gear position in terms of the order of the transmission ratios. A change of the gear position to increase the transmission ratio is termed down shift. The transmission 50 can take a neutral position. The neutral position is a state in which the power of the input shaft 51 is not transmittable to the output shaft 52. The power transmission mechanism 60 includes different power transmission paths 60p which correspond to the respective gear positions. When the gear position of the transmission 50 is changed, the power transmission path 60p on which power is transmitted is changed, too.

The drive sprocket 43 is provided on the output shaft 52. The drive sprocket 43 rotates together with the output shaft 52. As shown in FIG. 2, the driven sprocket 64 is provided on the axle shaft of the driving wheel 3. A chain 65 is wound on the drive sprocket 43 and the driven sprocket 64. The power of the output shaft 52 is transmitted to the driving wheel 3 through the chain 65. As a result, the driving wheel 3 rotates. Pulleys and a belt may be used in place of the sprockets 43 and 64 and the chain 65.

When the driving source torque is a positive torque, the power is transmitted from the engine 20A to the driving wheel 3. When the driving source torque is a positive torque, the driving wheel 3 basically accelerates or rotates at constant speed. When the driving source torque is a negative torque, the driving wheel 3 decelerates. Even when the driving source torque is a positive torque, the driving wheel 3 may decelerate when the front braking device or the rear braking device are being driven. Furthermore, even when the driving source torque is a positive torque, the driving wheel 3 may decelerate when the clutch 42 is in the cut-off state. Even when the driving source torque is a positive torque, the driving wheel 3 may decelerate when the vehicle is going up a steep slope. Even when the driving source torque is a negative torque, the driving wheel 3 may accelerate when the vehicle is going down a steep slope.

The transmission 50 will be detailed below.

As shown in FIG. 3, the transmission 50 is a constant-mesh transmission. The transmission 50 has six gear positions. The input shaft 51 is provided with gears 53a, 53b, 53c, 53d, 53e, and 53f. Hereinafter, the gears 53a, 53b, 53c, 53d, 53e, and 53f will be collectively referred to as gears 53 (see FIG. 5). The six gears 53 are different from each other in number of teeth. The output shaft 52 is provided with gears 54p, 54q, 54r, 54s, 54t, and 54u. Hereinafter, the gears 54p, 54q, 54r, 54s, 54t, and 54u will be collectively referred to as gears 54 (see FIG. 5). The six gears 54 are different from each other in number of teeth. The six gears 53a to 53f of the input shaft 51 are engaged with the six gears 54p to 54u of the output shaft 52, respectively.

The gears 53b and 53e are provided on the input shaft 51 to be relatively rotatable. The gears 54q and 54t respectively engaged with the gears 53b and 53e rotate together with the output shaft 52. The gears 54p, 54r, 54s, and 54u are provided on the output shaft 52 to be relatively rotatable. The gears 53a, 53c, 53d, and 53f respectively engaged with the gears 54p, 54r, 54s, and 54u rotate together with the input shaft 51.

The gears 53c and 53d are attached to the input shaft 51 to be movable in the axial direction. The gears 53c and 53d are connected to each other and move together in the axial direction. The gears 54q and 54t are attached to the output shaft 52 to be movable in the axial direction. Hereinafter, the gears 53c, 53d, 54q, and 54t will be referred to as movable gears 53c, 53d, 54q, and 54t.

The movable gears 53c, 53d, 54q, and 54t are driven in the axial direction by an unillustrated shift actuator. As a mechanism for driving the movable gears 53c, 53d, 54q, and 54t by the shift actuator, a shift cam and a shift fork (both not illustrated) which have been known are used. When the rider operates the shift pedal (not illustrated), a request to change the gear position of the transmission 50 is input to the later-described ECU 90. Hereinafter, this request will be referred to as a gear position change request. In response to the gear position change request, the ECU 90 controls the shift actuator. As a result, the rotational angle of the shift cam (rotational position) is controlled.

The movable gear 53c has dog projections 55c on one side surface. The movable gear 53d has dog projections 55d on one side surface. The movable gear 53b has dog recesses 56b on the surface facing the movable gear 53c. The movable gear 53e has dog recesses 56e on the surface facing the movable gear 53d. The movable gear 54q has dog projections 55q1 on one side surface and dog projections 55q2 on the other side surface. The movable gear 54p has dog recesses 56p on the surface facing the movable gear 54q. The movable gear 54r has dog recesses 56r on the surface facing the movable gear 54q. The movable gear 54t has dog projections 55t1 on one side surface and dog projections 55t2 on the other side surface. The movable gear 54s has dog recesses 56s on the surface facing the movable gear 54t. The movable gear 54u has dog recesses 56u on the surface facing the movable gear 54t.

In this way, the gears 53b, 53c, 53d, and 53e and the six gears 54 function as dog members. The dog members are members having dog portions (dog projection or dog recess). Hereinafter, the dog projections 55c, 55d, 55q1, 55q2, 55t1, and 55t2 will be collectively referred to as dog projections 55 (see FIG. 5 and FIG. 6). Hereinafter, the dog recesses 56b, 56e, 56p, 56r, 56s, and 56u will be collectively referred to as dog recesses 56 (see FIG. 5 and FIG. 6).

Figure 5:
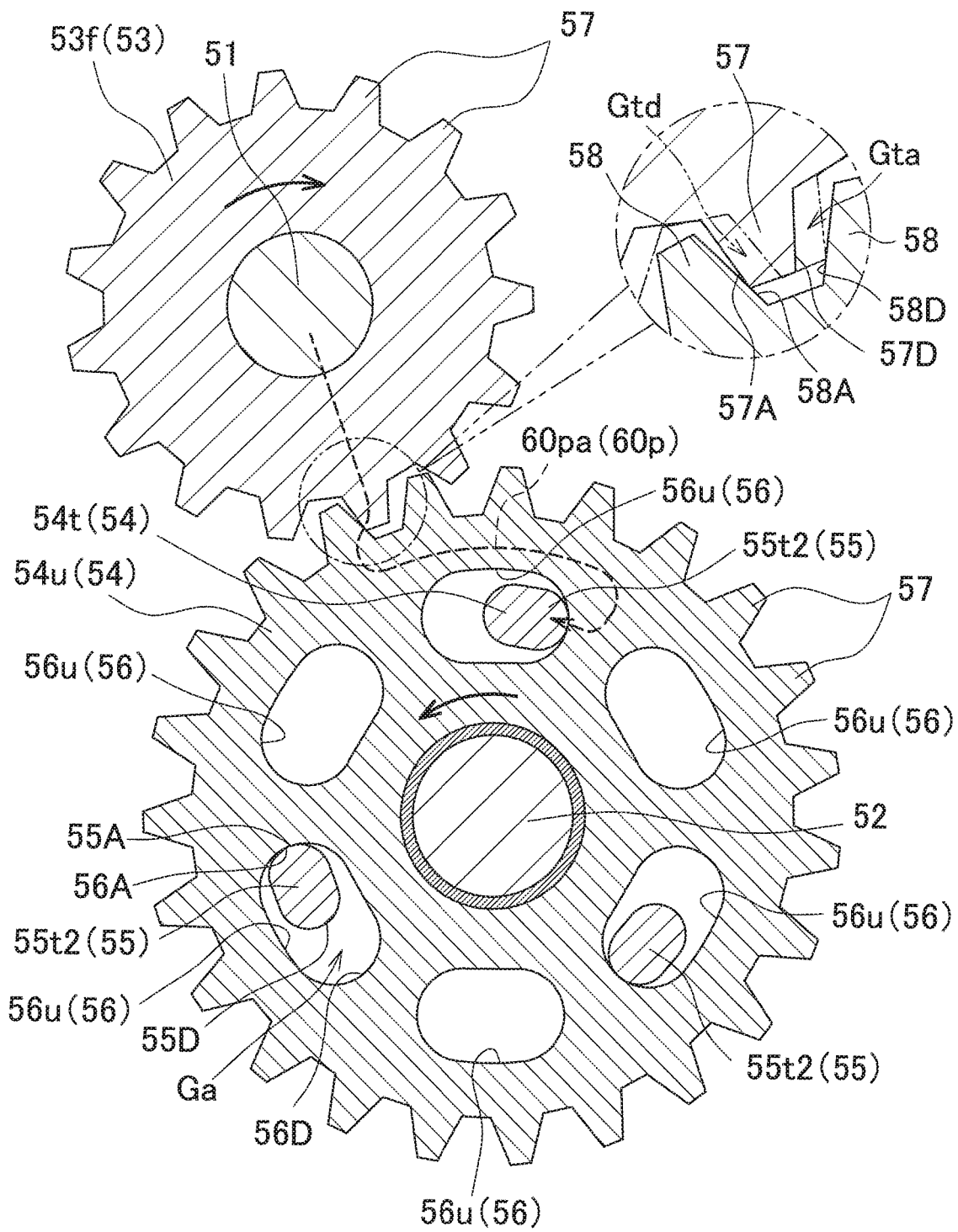
FIG. 5 is a cross section taken at a V-V line in FIG. 3.

As shown in FIG. 3, the dog projections 55 project from a side surface of the gear 53 or gear 54. Each dog recess 56 is recessed in shape. The dog projections 55 and the dog recesses 56 provided in two gears (two gears 53 or two gears 54) facing each other in the axial direction are arranged to be engageable with each other. As shown in FIG. 5, the dog recesses 56 provided in one gear (53 or 54) are lined up in the circumferential direction. The dog projections 55 provided in one gear (53 or 54) are lined up in the circumferential direction. The number of the dog projections 55 in one gear (53 or 54) is smaller than the number of the dog recesses 56 in the gear (53 or 54) facing these dog projections 55. The number of the dog projections 55 may be identical with the number of the dog recesses 56. The length in the circumferential direction of each dog recess 56 is longer than the length in the circumferential direction of each dog projection 55 in the gear (53 or 54) facing that dog recess 56.

After the movable gear (53 or 54) having the dog projections 55 moves in the axial direction toward the gear (53 or 54) having the dog recesses 56, the dog projections 55 are provided inside the dog recesses 56. Alternatively, after the movable gear (53 or 54) having the dog recesses 56 moves in the axial direction toward the gear (53 or 54) having the dog projections 55, the dog projections 55 are provided inside the dog recesses 56. When the dog projections 55 are provided inside the dog recesses 56, the dog projections 55 are in contact with the dog recesses 56. To be more specific, an end portion in the circumferential direction of each dog projection 55 makes contact with an end portion in the circumferential direction of each dog recess 56. This state is a state in which the dog projections 55 are engaged with the dog recesses 56.

FIG. 3 and FIG. 5 show a state in which the dog projections 55t2 of the gear 54t are in contact with the dog recesses 56u of the gear 54u. When the dog projections 55t2 are in contact with the dog recesses 56u while the clutch 42 is in the connection state, the gear 54t and the gear 54u rotate together. As a result, the power of the input shaft 51 is transmitted to the output shaft 52 through the gear 53f, the gear 54u, and the gear 54t in this order. On the power transmission path 60p in this case, the gear 53f, the gear 54u, and the gear 54t are lined up in this order. When the dog projections 55 other than the dog projections 55t2 are in contact with the dog recesses 56, the rotational force of the input shaft 51 is transmitted to the output shaft 52 through three gears, too. The three gears in this case are two gears 53 and one gear 54, or one gear 53 and two gears 54.

The gear position of the transmission 50 is different depending on which dog projections 55c, 55d, 55q1, 55q2, 55t1, and 55t2 make contact with the dog recesses 56. In other words, the six gear positions of the transmission 50 are equivalent to the states in which the six dog projections 55c, 55d, 55q1, 55q2, 55t1, and 55t2 make contact with the dog recesses 56. When the transmission 50 is in the neutral position, none of the dog projections 55 are inside the dog recesses 56.

As described above, the length in the circumferential direction of each dog recess 56 is longer than the length in the circumferential direction of the dog projection 55 in the gear (53 or 54) facing that dog recess 56. In other words, the two facing gears (53 or 54) are formed so that there is always play (backlash) between a dog recess 56 and a dog projection 55 which are engageable with each other.

Which one of the two end portions in the circumferential direction of the dog projection 55 makes contact with the dog recess 56 varies depending on whether the motorcycle 1 is accelerating or decelerating. In other words, the contact position between the dog projection 55 and the dog recess 56 varies depending on whether the driving wheel 3 is accelerating or decelerating. On this account, even though the same pair of a dog projection 55 and a dog recess 56 make contact with each other, the power transmission path 60*p* on which power is transmitted is different depending on whether the driving wheel 3 is accelerating or decelerating. The power transmission path 60*p* on which power is transmitted during the acceleration of the driving wheel 3 will be referred to as an acceleration power transmission path 60*pa* (see FIG. 6 and FIG. 7). The power transmission path 60*p* on which power is transmitted during the deceleration of the driving wheel 3 will be referred to as a deceleration power transmission path 60*pd*. The deceleration power transmission path 60*pd* is not shown in the drawings.

Figure 6:
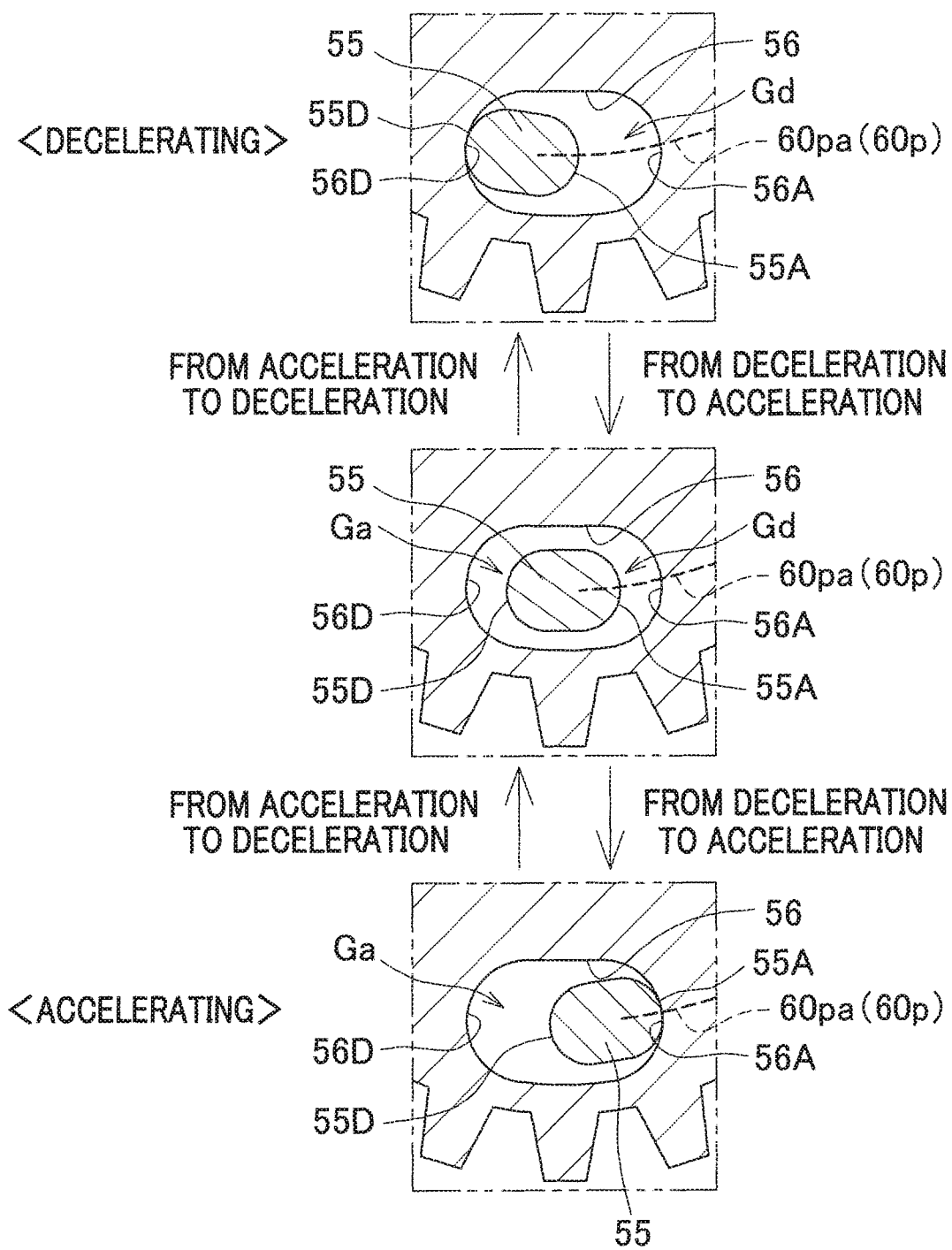
FIG. 6 illustrates a state of contact between a dog projection and a dog recess in FIG. 5.

As shown in FIG. 5 and FIG. 6, during the acceleration of the driving wheel 3, an acceleration contact position 55A of the dog projection 55 makes contact with an acceleration contact position 56A of the dog recess 56. The acceleration contact positions 55A and 56A constitute part of the acceleration power transmission path 60*pa*. As shown in FIG. 6, during the deceleration of the driving wheel 3, a deceleration contact position 55D of the dog projection 55 makes contact with a deceleration contact position 56D of the dog recess 56. The deceleration contact positions 55D and 56D constitute part of the deceleration power transmission path 60*pd*. The acceleration contact position 55A and the deceleration contact position 55D are one end portion and the other end portion in the circumferential direction of the dog projection 55, respectively. The acceleration contact position 56A and the deceleration contact position 56D are one end portion and the other end portion in the circumferential direction of the dog recess 56, respectively.

As shown in FIG. 5 and FIG. 6, during the acceleration of the driving wheel 3, there is backlash Ga between the deceleration contact position 55D of the dog projection 55 and the deceleration contact position 56D of the dog recess 56. As shown in FIG. 6, during the deceleration of the driving wheel 3, there is backlash Gd between the acceleration contact position 55A of the dog projection 55 and the acceleration contact position 56A of the dog recess 56.

When the driving wheel 3 changes from a deceleration state to an acceleration state, to begin with, the deceleration contact positions 55D and 56D leave from each other. Meanwhile, the backlash Gd between the acceleration contact positions 55A and 56A decreases. Therefore the dog projection 55 and the dog recess 56 become temporarily not in contact with each other. After the backlash Gd between the acceleration contact positions 55A and 56A is eliminated, a torque is transmitted between the dog projection 55 and the dog recess 56. Then the driving wheel 3 starts to accelerate. To put it differently, when there is the backlash Ga on the acceleration power transmission path 60*pa*, no torque is transmitted between the dog projection 55 and the dog recess 56, and the driving wheel 3 does not accelerate. When the driving wheel 3 changes from the acceleration state to the deceleration state, the acceleration contact positions 55A and 56A leave from each other. Meanwhile, backlash Ga between the deceleration contact positions 55D and 56D decreases. After the backlash Ga between the deceleration contact positions 55D and 56D is eliminated, a torque is transmitted between the dog projection 55 and the dog recess 56. Then the driving wheel 3 starts to decelerate.

The teeth portions of the six gears 53 will be collectively termed teeth portions 57. The teeth portions of the six gears 54 will be collectively termed teeth portions 58. The gears 53 and 54 engaged with each other are formed so that there is backlash between the teeth portions 57 and 58. As shown in FIG. 5, during the acceleration of the driving wheel 3, an acceleration contact position 57A of the teeth portion 57 of the gear 53 is in contact with an acceleration contact position 58A of the teeth portion 58 of the gear 54. During the deceleration of the driving wheel 3, a deceleration contact position 57D of the teeth portion 57 of the gear 53 is in contact with a deceleration contact position 58D of the teeth portion 58 of the gear 54. During the acceleration of the driving wheel 3, there is backlash Gta between the deceleration contact position 57D of the teeth portion 57 of the gear 53 and the deceleration contact position 58D of the teeth portion 58 of the gear 54. During the deceleration of the driving wheel 3, there is backlash Gtd between the acceleration contact position 57A of the teeth portion 57 of the gear 53 and the acceleration contact position 58A of the teeth portion 58 of the gear 54.

When the driving wheel 3 changes from the deceleration state to the acceleration state, the deceleration contact positions 57D and 58D leave from each other whereas the backlash Gtd between the acceleration contact positions 57A and 58A decreases. After the backlash Gtd between the acceleration contact positions 57A and 58A is eliminated, the driving wheel 3 starts to accelerate. To be more precise, after the backlash Gtd between the acceleration contact positions 57A and 58A is eliminated, the area of the contact surface between the acceleration contact position 55A and the acceleration contact position 56A increases from zero. After the area of the contact surface between the acceleration contact position 55A and the acceleration contact position 56A is maximized, the driving wheel 3 starts to accelerate. When the driving wheel 3 changes from the acceleration state to the deceleration state, the acceleration contact positions 57A and 58A leave from each other whereas the backlash Gta between the deceleration contact positions 57D and 58D decreases. After the backlash Gta between the deceleration contact positions 57D and 58D is eliminated, the driving wheel 3 starts to decelerate.

The gear (53 or 54) having the dog projections 55 and the gear (53 or 54) facing that gear having the dog recesses 56 are equivalent to power transmission members of the present teaching. The gear 53 and the gear 54 engaged with each other are also equivalent to the power transmission members of the present teaching. The power transmission mechanism 60 has other backlashes between the power transmission members, in addition to the backlash between the dog portions of the gear 53 and the dog portions of the gear 53, the backlash between the dog portions of the gear 54 and the dog portions of the gear 54, the backlash between the teeth portion 57 of the gear 53 and the teeth portion 58 of the gear 54. For example, there is backlash between the drive gear 40 and the driven gear 41. The drive gear 40 and the driven gear 41 are therefore equivalent to the power transmission members of the present teaching, too. There are backlashes between the drive sprocket 43 and the chain 65 and between the chain 65 and the driven sprocket 64, too. The drive sprocket 43 and the chain 65 are therefore equivalent to the power transmission members of the present teaching, too. The chain 65 and the driven sprocket 64 are equivalent to the power transmission members of the present teaching, too. Hereinafter, these members equivalent to the power transmission members of the present teaching may be referred to as power transmission members.

When the driving wheel 3 changes from the deceleration state to the acceleration state, the backlashes between the power transmission members on the acceleration power transmission path 60*pa* are eliminated in order. The backlash between the power transmission members closest to the engine 20A is eliminated, then the backlash between the power transmission members second closest to the engine 20A is eliminated, and so on. After the backlashes between all power transmission members on the acceleration power transmission path 60*pa* are eliminated, the driving wheel 3 starts to accelerate. When the driving wheel 3 changes from the deceleration state to the acceleration state, the backlashes between the power transmission members on the deceleration power transmission path 60*pd* are eliminated in order. The backlash between the power transmission members closest to the driving wheel 3 is eliminated, then the backlash between the power transmission members second closest to the driving wheel 3 is eliminated, and so on. After the backlashes between all power transmission members on the deceleration power transmission path 60*pd* are eliminated, the driving wheel 3 starts to decelerate.

As shown in FIG. 4, the motorcycle 1 includes an input shaft sensor 83, an output shaft sensor 84, a gear position sensor 85, and a neutral sensor 86. The input shaft sensor 83 is configured to calculate the rotational angular speed of the input shaft 51. The output shaft sensor 84 is configured to calculate the rotational angular speed of the output shaft 52. The gear position sensor 85 is configured to detect the gear position of the transmission 50. To be more specific, the gear position sensor 85 detects the rotational angle of the shift cam (not illustrated). The neutral sensor 86 is configured to detect whether the transmission 50 is in the neutral position. The neutral sensor 86 outputs an electrical signal only when the rotational angle of the shift cam (not illustrated) is equal to an angle corresponding to the neutral position.

<5> Structure of ECU 90

<5-1> Overall Structure of ECU 90

The motorcycle 1 includes the ECU (Electronic Control Unit) 90 which is configured to control the components of the motorcycle 1. The ECU 90 may be a single device provided at a single position or may consist of a plurality of devices which are positionally separated from one another. As shown in FIG. 4, the ECU 90 is connected to sensors such as the accelerator sensor 72, the clutch sensor 73, the throttle opening degree sensor 82, the engine rotation speed sensor 81, the gear position sensor 85, the neutral sensor 86, the input shaft sensor 83, and the output shaft sensor 84. The ECU 90 is further connected to members such as the ignition coil 30, the injector 35, the fuel pump 36, and the throttle valve 37.

The ECU 90 includes a processor and a storage device. The processor is, for example, a CPU (Central Processing Unit), a GPU (Graphics Processing Unit), a microcontroller, a micro processor, an application specific integrated circuit (ASIC), a programmable logic circuit (PLC), a field programmable gate array (FPGA), etc. The processor may include a register therein. The storage device stores information necessary for processes executed by the processor. The storage device includes, for example, a ROM (Read Only Memory) and a RAM (Random Access Memory). The RAM temporarily stores data when the processor executes a program. The ROM stores a program executed by the processor. The processor performs information processing based on a program and date stored in the storage device. Functional units are embodied by the information processing.

The ECU 90 is configured to send an operation command signal to the ignition coil 30, the injector 35, the fuel pump 36, the throttle valve 37, etc. The driving source torque is controlled by controlling the ignition coil 30, the injector 35, the fuel pump 36, and the throttle valve 37. The ECU 90 is included in the driving source torque controller 91 of the embodiment above. The ECU 90 is included in the driving source torque controller of the present teaching. The following will specifically describe the processes carried out by the ECU 90.

<5-2> Estimation of Driving Source Torque

The ECU 90 is configured to estimate the driving source torque. The ECU 90 estimates the driving source torque based on at least a signal from the throttle opening degree sensor 82 and a signal from the engine rotation speed sensor 81. To be more specific, for example, the ECU 90 estimates the driving source torque by using a map which is stored in the storage unit of the ECU 90 in advance. The ECU 90 preferably estimates the driving source torque based on an ignition timing of the ignition plug 29, a signal from the throttle opening degree sensor 82, and a signal from the engine rotation speed sensor 81. Hereinafter, an estimated value of the driving source torque calculated by the ECU 90 will be referred to as an estimated driving source torque.

<5-5> Detection of Power Transmission State

The ECU 90 calculates the relative rotational angle between the input shaft 51 and the output shaft 52 based on a signal from the input shaft sensor 83 and a signal from the output shaft sensor 84. To be more specific, to begin with, the ECU 90 calculates the relative rotational angular speed between the input shaft 51 and the output shaft 52 from the rotational angular speed of the input shaft 51 detected by the input shaft sensor 83 and the rotational angular speed of the output shaft 52 detected by the output shaft sensor 84. The relative rotational angle between the input shaft 51 and the output shaft 52 is calculated by time integration of the calculated rotational angular speed.

The relative rotational angle between the input shaft 51 and the output shaft 52 in a particular case is assumed to be zero. The particular case is a case where the relative rotational angle is at a limit value when the driving wheel 3 is decelerating. The arrangement shown in FIG. 5, in which the gears 53*f*, 54*u*, and 54*t* are lined up on the power transmission path 60*p*, is taken as an example. When the deceleration contact position 57D of the teeth portion 57 of the gear 53*f* is in contact with the deceleration contact position 58D of the teeth portion 58 of the gear 54*u* and the deceleration contact position 56D of the dog recess 56 of the gear 54*u* is in contact with the deceleration contact position 55D of the dog projection 55 of the gear 54*t*, the relative rotational angle between the input shaft 51 and the output shaft 52 is at the limit value when the driving wheel 3 is decelerating. In regard to the relative rotational angle between the input shaft 51 and the output shaft 52, the particular case may be a case where the relative rotational angle is at the limit value when the driving wheel 3 is accelerating.

<5-4> Control of Fuel Supply Amount

The ECU 90 is configured to control an amount of fuel supplied by the injector 35. To be more specific, the ECU 90 controls a fuel injection time of the injector 35. The ECU 90 controls the fuel supply amount based on signals from sensors 71 to 73 and 81 to 86, etc. The ECU 90 is configured to send an operation command signal based on the determined fuel supply amount to the fuel pump 36 and the injector 35. In response to this, the injector 35 injects fuel, the amount of which has been determined by the ECU 90.

<5-5> Control of Ignition Timing

The ECU 90 controls an ignition timing of the ignition plug 29. The ignition timing indicates a timing at which the ignition plug 29 discharges electricity. The ignition timing is represented by a rotational angle of the crankshaft 25 from a compression top dead center which is the reference point. The compression top dead center is the top dead center of the piston 26 between the compression process and the combustion process. The ECU 90 controls the ignition timing based on signals from the sensors 71 to 73 and 81 to 86, etc. For example, the ignition timing is controlled based on a signal from the throttle opening degree sensor 82 and a signal from the engine rotation speed sensor 81. The ECU 90 sends, to the ignition coil 30, an operation command signal based on the determined ignition timing. As a result, the ignition plug 29 performs spark discharge at a predetermined timing.

<5-6> Shock Suppression Control

When the driving wheel 3 is switched from the deceleration state to the acceleration state, the ECU 90 performs shock suppression control to control the driving source torque. To put it differently, the ECU 90 performs the shock suppression control when the driving source torque is controlled to accelerate the driving wheel 3. The shock suppression control is control for suppressing shock to the motorcycle 1, which occurs when backlash between power transmission members on the acceleration power transmission path 60pa is eliminated. To put it differently, the shock suppression control is performed to suppress shock to the motorcycle 1, which occurs when a state in which power transmission members on the acceleration power transmission path 60pa are not in contact with each other is changed to a state in which the power transmission members are in contact with each other.

The deceleration state of the driving wheel 3 before the start of the shock suppression control is not limited to any particular state, as long as the driving wheel 3 is decelerating. The driving source torque may be a negative torque. The driving source torque may be a positive torque and the clutch 42 may be in the cut-off state. The driving source torque may be a positive torque and the vehicle may be going up a steep slope. The driving source torque may be a positive or negative torque and at least one of the front braking device or the rear braking device may be driven.

The shock suppression control may not always be performed when the driving wheel 3 is switched from the deceleration state to the acceleration state. The shock suppression control may always be performed when the driving wheel 3 is switched from the deceleration state to the acceleration state. The motorcycle 1 is preferably arranged to allow the rider to determine whether to perform the shock suppression control. For example, whether to perform the shock suppression control may be selectable by an input to a switch on the handle unit 5. The motorcycle 1 may have a running mode in which the shock suppression control is performed and a running mode in which the shock suppression control is not performed. These running modes may be selectable by the rider. The shock suppression control may be different between running modes.

FIG. 7A to FIG. 7E are graphs showing an example where the shock suppression control is performed. The horizontal axes in FIG. 7A to FIG. 7E indicate the same time axis. The vertical axis in FIG. 7A indicates a throttle opening degree detected by the throttle opening degree sensor 82 and an accelerator operation degree detected by the accelerator sensor 72. The vertical axis in FIG. 7B indicates an actual driving source torque. It is noted that an estimated driving source torque is scarcely delayed from an actual driving source torque. A two-dot chain curved line in FIG. 7B indicates a driving source torque when the shock suppression control is not performed. The vertical axis in FIG. 7C indicates an engine rotation speed. The vertical axis in FIG. 7D indicates a relative rotational angle between the input shaft 51 and the output shaft 52, which is detected by the ECU 90. The vertical axis in FIG. 7E indicates the rotation speed of the driving wheel (rear wheel) detected by a wheel speed sensor provided at the rear wheel 3.

In the example shown in FIG. 7A to FIG. 7E, in the whole period in the graph, the clutch 42 is in the connection state and neither the front braking device nor the rear braking device is driven. Furthermore, the road surface is substantially horizontal in the whole period in the graph. As shown in FIG. 7A and FIG. 7B, at the left end of the horizontal axis, the accelerator operation degree is zero and the driving source torque is a negative torque. In short, the engine brake is in operation. The driving wheel 3 is therefore decelerating Immediately after the point of time at the left end of the horizontal axis, the accelerator operation degree increases. The ECU 90 therefore starts the control for switching from the deceleration state to the acceleration state. To begin with, the ECU 90 increases the opening degree of the throttle valve 37 as shown in FIG. 7A. As a result of this, the driving torque increases. After the driving torque becomes a positive torque, power transmission members on the power transmission path 60 leave from neighboring power transmission members in order. The power transmission member closest to the engine 20A leaves from the neighboring power transmission member, then the power transmission member second closest to the engine 20A leaves from the neighboring power transmission member, and so on.

The ECU 90 determines whether at least one of a start condition A1 or a start condition A2 of the shock suppression control, which will be described below, is established. The ECU 90 may be programmed to perform determination for only one of the start conditions A1 and A2 of the shock suppression control. The ECU 90 may be programmed to be able to perform determination for both of the start conditions A1 and A2 of the shock suppression control.

The start condition A1 of the shock suppression control is that an estimated driving source torque becomes equal to or larger than a predetermined threshold torque TrA1 (first threshold torque). An example of the threshold torque TrA1 is shown in the graph of FIG. 7B. The threshold torque TrA1 may not be a single value. The ECU 90 may change the threshold torque TrA1 based on a signal from the gear position sensor 85, for example. The ECU 90 may change the threshold torque TrA1 based on a signal from the gear position sensor 85 and a signal from the engine rotation speed sensor 81. The ECU 90 may change the threshold torque TrA1 based on an estimated driving source torque. The threshold torque TrA1 may not be changed.

For example, as shown in FIG. 7B, assume that a point of time when the estimated driving source torque becomes equal to a predetermined threshold torque TrA0 (second threshold torque) is a reference time point t0. While the threshold torque TrA0 is zero in FIG. 7B, this torque may be a positive torque or a negative torque. The ECU 90 calculates a time integrated value of the estimated driving source torque from the reference time point t0. The start condition A2 of the shock suppression control is that the integrated value becomes equal to or larger than a predetermined threshold value. The threshold torque TrA0 may not be a single value. The threshold value may not be a single value. The ECU 90 may change the threshold torque TrA0 or the threshold value based on a signal from the gear position sensor 85, for example. The ECU 90 may change the threshold torque TrA0 or the threshold value based on a signal from the gear position sensor 85 and a signal from the engine rotation speed sensor 81. The ECU 90 may change the threshold torque TrA0 or the threshold value based on an estimated driving source torque. The threshold torque TrA0 may not be changed. The threshold value may not be changed.

When the start condition A1 or A2 of the shock suppression control is established, the ECU 90 determines whether one of later-described non-start conditions B1 to B3 of the shock suppression control is established. The start conditions A1 and A2 are conditions to start the shock suppression control. In other words, the start conditions A1 and A2 are conditions for determining a timing to start the shock suppression control. The non-start conditions B1 to B3 are conditions not to start the shock suppression control. The ECU 90 may be programmed to perform determination for only one or some of the non-start conditions B1 to B3 of the shock suppression control. The ECU 90 may be programmed to be able to perform determination for all of the non-start conditions B1 to B3 of the shock suppression control.

Assume that the start condition A1 or A2 of the shock suppression control is established, and the ECU 90 performs determination for at least one of the non-start conditions B1 to B3 of the shock suppression control but no non-start condition is established as a result of the determination. In such a case, the ECU 90 determines to start the shock suppression control. The start conditions A1 and A2 are conditions utilizing the estimated driving source torque. The ECU 90 therefore determines a timing to start the shock suppression control based on the estimated driving source torque.

The non-start condition B1 of the shock suppression control is that a state in which power cannot be transmitted between the crankshaft 25 and the driving wheel 3 is detected. The clutch sensor 73 or the neutral sensor 86 is used for this detection. When it is detected that the clutch 42 is in the cut-off state by a signal from the clutch sensor 73 or when it is detected that the transmission 50 is in the neutral position by a signal from the neutral sensor 86, ECU 90 determines that power cannot be transmitted between the crankshaft 25 and the driving wheel 3.

The non-start condition B2 of the shock suppression control is that a gear position change request is made or a change of the gear position of the transmission 50 is detected. The non-start condition B1 is established by switching the clutch 42 to the cut-off state when changing the gear position of the transmission 50. When the gear position is changed, however, the clutch 42 may not be switched to the cut-off state. The non-start condition B2 is a condition not to start the shock suppression control in such a case. The gear position change request is input to the ECU 90 as the shift pedal (or the shift switch) is operated. Whether the gear position of the transmission 50 has been changed may be determined based on a signal from the gear position sensor 85. In this case, the gear position sensor 85 is included in the driving source torque controller of the present teaching. Whether the gear position of the transmission 50 has been changed may be determined based on the gear position estimated by the ECU 90. The estimation of the gear position may be done by using a signal from the engine rotation speed sensor 81 and a signal from the output shaft sensor 84, for example. When the motorcycle 1 includes a wheel speed sensor, the estimation of the gear position may be done by using a signal from the wheel speed sensor instead of the output shaft sensor 84.

The ECU 90 determines whether a blipping operation has been performed. The blipping operation is an operation to temporarily increase the driving source torque during down shift in order to smoothly shift the transmission 50 down.

The ECU 90 determines that the blipping operation has been performed when the gear position of the transmission 50 is different from the gear position with the highest transmission ratio, the accelerator operation degree falls within a predetermined first blipping determination range, and an amount of change of the accelerator operation degree falls within a predetermined second blipping determination range. The first blipping determination range and the second blipping determination range may be different between the gear positions. The non-start condition B3 of the shock suppression control is that it is determined that the blipping operation has been performed.

The ECU 90 performs the shock suppression control when it is determined based on the estimated driving source torque, etc. that the shock suppression control is started. During the shock suppression control, the driving source torque is controlled so that one of the following two states is established. The first state is a state in which the absolute value of the relative speed between a plurality of power transmission members on the acceleration power transmission path 60pa decreases when the backlash between the power transmission members decreases. The second state is a state in which the transmission torque transmitted between plural power transmission members on the acceleration power transmission path 60pa when the backlash between the power transmission members decreased and was eliminated decreases. During the shock suppression control, the driving source torque may be controlled so that both of the first state and the second state are established, the driving source torque may be controlled so that only the first state is established, or the driving source torque may be controlled so that only the second state is established. This shock suppression control suppresses the shock to the motorcycle 1, which occurs when the backlash between plural power transmission members on the acceleration power transmission path 60pa is eliminated.

The sentence "the absolute value of the relative speed of a plurality of power transmission members on the acceleration power transmission path 60pa decreases when backlash between the power transmission members decreases" indicates that the absolute value of the relative speed between the power transmission members decreases when the backlash between the power transmission members on the acceleration power transmission path 60pa decreases, as compared to cases where shock suppression control is not performed. The absolute value of the relative speed between the power transmission members on the acceleration power transmission path 60pa may be controlled to gradually decrease when the backlash between the power transmission members decreases. The sentence "the transmission torque transmitted between a plurality of power transmission members on the acceleration power transmission path 60pa when the backlash between the power transmission members on is eliminated decreases" indicates that the transmission torque transmitted between the power transmission members when the backlash between the power transmission members on the acceleration power transmission path 60pa is eliminated decreases, as compared to cases where the shock suppression control is not performed.

The control of the driving source torque during the shock suppression control is, to be more specific, decreasing and then increasing the driving source torque as shown in FIG. 7B, for example. The increasing rate is smaller than the decreasing rate. The increase in the driving source torque is relatively gradual. Because the driving source torque is decreased and then increased, the driving torque can be suppressed while the driving source torque is increased, as compared to cases where the shock suppression control is not performed. For this reason, the relative speed between the power transmission members on the acceleration power transmission path 60pa is low when the backlash (e.g., Gd) between the power transmission members decreases. This suppresses the shock which occurs when the backlash between the power transmission members is eliminated.

The control of the driving source torque may be, to be more specific, control of an ignition timing. The control may be control of the throttle opening degree. The control may be control of the throttle opening degree and the fuel injection amount. The control may be control of both the ignition timing and the throttle opening degree. The control may be different from the examples above. When the ignition timing is controlled, the ignition timing is lagged as compared to cases where the shock suppression control is not performed.

When one of the following termination conditions C1 to C4 of the shock suppression control is established, the ECU 90 terminates the shock suppression control. The termination conditions C1 to C4 are conditions with which the shock suppression control is terminated. The ECU 90 may be programmed to perform determination for only one or some of the termination conditions C1 to C4 of the shock suppression control. The ECU 90 may be programmed to be able to perform determination for all of the termination conditions C1 to C4 of the shock suppression control. The order of priority may be set for determinations for the termination conditions C1 to C4. For example, determination for one of the termination conditions C1 to C3 may be performed when the termination condition C4 is not established.

The termination condition C1 of the shock suppression control is that the time elapsed from a predetermined termination determination standard time becomes not shorter than a predetermined termination determination time. In other words, the ECU 90 determines the timing to terminate the shock suppression control based on the elapsed time. The termination determination time varies depending on the termination determination standard time. The termination determination standard time may be a point of time to start the shock suppression control, for example. The termination determination standard time may be a point of time when the estimated driving source torque becomes equal to or larger than a predetermined value, for example. This predetermined value may be identical with the threshold torque TrA1 or the threshold torque TrA0 described above, or different from these torques. The termination determination time corresponding to each termination determination standard time may be changed by the ECU 90. The termination determination time corresponding to each termination determination standard time may not be changed.

The termination conditions C2 and C3 of the shock suppression control are conditions for determining a timing to terminate the shock suppression control based on a signal from the engine rotation speed sensor 81. As shown in FIG. 7C and FIG. 7E, when the driving wheel 3 changes from the deceleration state to the acceleration state, the engine rotation speed increases and then decreases. To be more specific, when the control for changing the driving wheel 3 from the deceleration state to the acceleration state starts, the crankshaft 25 temporarily receives no load, and hence the engine rotation speed increases. In the example shown in FIG. 7, after the driving torque is changed from a negative torque to a positive torque, the crankshaft 25 temporarily receives no load. Thereafter, because the acceleration contact positions (e.g., 55A and 56A) of the first power transmission member and the second power transmission member make contact with each other, the engine rotation speed decreases. The termination condition C2 is detection of this increase in the engine rotation speed. The termination condition C3 is detection of the decrease in the engine rotation speed after the increase.

To be more specific, the termination condition C2 of the shock suppression control is that, after the start of the shock suppression control, the engine rotation speed detected by the engine rotation speed sensor 81 becomes equal to or higher than a predetermined termination determination speed. Alternatively, the termination condition C2 is that, after the start of the shock suppression control, the increasing rate of the engine rotation speed detected by the engine rotation speed sensor 81 becomes equal to or higher than a predetermined termination determination value. The termination determination value may be zero. The termination condition C2 of the shock suppression control may be a condition which utilizes a signal from the engine rotation speed sensor 81 but is different from the examples above.

The termination condition C3 of the shock suppression control is that, after the shock suppression control starts, the engine rotation speed detected by the engine rotation speed sensor 81 increases and then decreases. Alternatively, the termination condition C3 is that, after the shock suppression control starts, the engine rotation speed detected by the engine rotation speed sensor 81 increases and then decreases to a predetermined value or lower. The termination condition C3 of the shock suppression control may be a condition which utilizes a signal from the engine rotation speed sensor 81 but is different from the examples above.

The termination condition C4 of the shock suppression control is a condition for determining a timing to terminate the shock suppression control based on the relative rotational angle between the input shaft 51 and the output shaft 52 detected by the ECU 90. As described above, the relative rotational angle between the input shaft 51 and the output shaft 52 in a particular case is assumed to be zero and the particular case is a case where the relative rotational angle is at a limit value when the driving wheel 3 decelerates. On this account, as shown in FIG. 7D, the relative rotational angle between the input shaft 51 and the output shaft 52 increases from zero when the driving wheel 3 changes from the deceleration state to the acceleration state. The termination condition C4 utilizes this increase in the relative rotational angle. To be more specific, the termination condition C4 of the shock suppression control is that the relative rotational angle between the input shaft 51 and the output shaft 52 becomes equal to or larger than a predetermined termination determination angle. The termination determination angle is preferably larger than the intermediate value between the minimum value (zero) and the maximum value. The termination determination angle may be a value equal to or smaller than the intermediate value between the minimum value (zero) and the maximum value. When the relative rotational angle between the input shaft 51 and the output shaft 52 in a particular case is assumed to be zero and the particular case is a case where the relative rotational angle is at a limit value when the driving wheel 3 is decelerating, the termination condition C4 of the shock suppression control may be that the relative rotational angle between the input shaft 51 and the output shaft 52 becomes equal to or smaller than a predetermined termination determination angle.

When one of termination conditions D1 and D2 of the shock suppression control is established, the ECU 90 terminates the shock suppression control. The termination conditions D1 and D2 of the shock suppression control are conditions with which the shock suppression control is terminated halfway through. The ECU 90 may be programmed to perform determination for only one of the termination condition D1 and D2 of the shock suppression control. The ECU 90 may be programmed to be able to perform determination for both of the termination conditions D1 and D2 of the shock suppression control. The ECU 90 may not perform determination for both of the termination conditions D1 and D2 of the shock suppression control.

The termination condition D1 of the shock suppression control is that a state in which power cannot be transmitted between the crankshaft 25 and the driving wheel 3 is detected after the start of the shock suppression control. The clutch sensor 73 or the neutral sensor 86 is used for this detection. When it is detected that the clutch 42 is in the cut-off state by a signal from the clutch sensor 73 or when it is detected that the transmission 50 is in the neutral position by a signal from the neutral sensor 86, ECU 90 determines that power transmission between the crankshaft 25 and the driving wheel 3 is impossible. The clutch sensor 73 and the neutral sensor 86 are encompassed in the driving source torque controller of the present teaching.

The termination condition D2 of the shock suppression control is that, after the start of the shock suppression control, a gear position change request is made or a change in the gear position of the transmission 50 is detected. The termination condition D1 is established by switching the clutch 42 to the cut-off state when changing the gear position of the transmission 50. When the gear position is changed, however, the clutch 42 may not be switched to the cut-off state. The termination condition D2 is a condition to terminate the shock suppression control in such a case. The gear position change request is input to the ECU 90 when the shift pedal (or the shift switch) is operated. Whether the gear position of the transmission 50 has been changed may be determined based on a signal from the gear position sensor 85. In this case, the gear position sensor 85 is included in the driving source torque controller of the present teaching. Whether the gear position of the transmission 50 has been changed may be determined based on the gear position estimated by the ECU 90. The ECU 90 estimates the gear position based on, for example, a signal from the engine rotation speed sensor 81 and a signal from the output shaft sensor 84. When the motorcycle 1 includes a wheel speed sensor, the estimation of the gear position may be done by using a signal from the wheel speed sensor instead of the output shaft sensor 84.

The specific example of the embodiment exerts the following effects in addition to the effects obtained by the above-described embodiment of the present teaching.

When the ECU 90 estimates the driving source torque based on a signal from the throttle opening degree sensor 82 and a signal from the engine rotation speed sensor 81, the following effects are obtained. The driving source torque can be estimated relatively accurately. As a result, the suppression of the occurrence of shock to the motorcycle 1 is further ensured. A typical motorcycle includes a throttle opening degree sensor and an engine rotation speed sensor. It is therefore possible to estimate the driving source torque by using the sensors which are typically included in motorcycles. In other words, it is unnecessary to provide an additional sensor for shock suppression control.

When the ECU 90 estimates the driving source torque based on a signal from the throttle opening degree sensor 82, a signal from the engine rotation speed sensor 81, and an ignition timing of the ignition plug 29, the following effect is obtained. The driving source torque is further accurately estimated as compared to cases where a signal from the throttle opening degree sensor 82 and a signal from the engine rotation speed sensor 81 are used but an ignition timing is not used for the estimation of the driving source torque. The suppression of the occurrence of shock to the motorcycle 1 is therefore further ensured.

The following effects are obtained by starting the shock suppression control when the start condition A1 of the shock suppression control is established. The start condition A1 of the shock suppression control is that the estimated driving source torque is equal to or larger than the threshold torque TrA1. When the driving wheel 3 changes from the deceleration state to the acceleration state, the driving source torque increases. When the driving source torque is increasing but small, shock due to the contact between the power transmission members may not occur. The ECU 90 determines whether the estimated driving source torque becomes equal to or larger than the threshold torque TrA1. This makes it possible to accurately detect whether shock to the motorcycle 1 may occur. The ECU 90 performs the shock suppression control when the estimated driving source torque becomes equal to or larger than the threshold torque TrA1. It is therefore possible to further ensure not to perform the shock suppression control in a state in which shock to the motorcycle 1 does not occur.

The following effects are obtained by starting the shock suppression control when the start condition A2 of the shock suppression control is established. The start condition A2 of the shock suppression control is that a time integrated value of the estimated driving source torque from the point of time where the estimated driving source torque becomes equal to or larger than the second threshold torque becomes not smaller than a threshold value. Based on whether the integrated value of the estimated driving source torque becomes not smaller than the threshold value, it is possible to further accurately detect a state in which shock to the motorcycle 1 may occur. The ECU 90 performs the shock suppression control when the integrated value becomes not smaller than the threshold value. It is therefore possible to further ensure not to perform the shock suppression control in a state in which shock to the motorcycle 1 does not occur.

The following effects are obtained by terminating the shock suppression control when the termination condition C1 of the shock suppression control is established. The termination condition C1 of the shock suppression control is that the time elapsed from a predetermined termination determination standard time becomes not shorter than a predetermined termination determination time. After some time elapses from the start of the shock suppression control, it is assumed that power is being transmitted between the power transmission members. For this reason, because the timing to terminate the shock suppression control is determined based on the elapsed time, it is possible to reliably perform the shock suppression control when the power transmission members make contact with each other. Furthermore, it is possible to prevent the shock suppression control from being performed for an unnecessarily long time.

The following effects are obtained by terminating the shock suppression control when the termination condition C2 or C3 of the shock suppression control is established. The termination conditions C2 and C3 of the shock suppression control are conditions based on a signal from the engine rotation speed sensor 81. The engine rotation speed may increase until the backlash between the power transmission members on the acceleration power transmission path 60*pa* is eliminated. The engine rotation speed may temporarily decrease after the backlash between the power transmission members on the acceleration power transmission path 60*pa* is eliminated. By utilizing these characteristics, it is possible to determine the timing to terminate the shock suppression control. Because the timing to terminate the shock suppression control is determined based on the engine rotation speed, it is possible to reliably perform the shock suppression control when the power transmission members make contact with each other. Furthermore, it is possible to prevent the shock suppression control from being performed for an unnecessarily long time.

The following effects are obtained by terminating the shock suppression control when the termination condition C4 of the shock suppression control is established. The termination condition C4 of the shock suppression control is a condition based on the relative rotational angle between the input shaft 51 and the output shaft 52 detected by the ECU 90. When the driving wheel 3 changes from the deceleration state to the acceleration state, the relative rotational angle between the input shaft 51 and the output shaft 52 changes. Based on the relative rotational angle between the input shaft 51 and the output shaft 52, it is possible to estimate whether power is being transmitted between the power transmission members. For this reason, because the timing to terminate the shock suppression control is determined based on the relative rotational angle between the input shaft 51 and the output shaft 52, it is possible to reliably perform the shock suppression control when the power transmission members make contact with each other.

Furthermore, it is possible to prevent the shock suppression control from being performed for an unnecessarily long time.

The following effect is obtained by terminating the shock suppression control when the termination condition D1 of the shock suppression control is established. The termination condition D1 of the shock suppression control is that a state in which power cannot be transmitted between the engine 20A and the driving wheel 3 is detected by the clutch sensor 73 or the neutral sensor 86. In the state in which power cannot be transmitted between the engine 20A and the driving wheel 3, significant shock is unlikely to occur even if the power transmission members make contact with each other. The shock suppression control is therefore unnecessary. The ECU 90 terminates the shock suppression control when the state in which power cannot be transmitted between the engine 20A and the driving wheel 3 is detected. It is therefore possible to prevent the shock suppression control from being performed for an unnecessarily long time.

The following effect is obtained by terminating the shock suppression control when the termination condition D2 of the shock suppression control is established. The termination condition D2 of the shock suppression control is that a gear position change request is made or a change of the gear position is detected. When the gear position of the transmission 50 is changed, the acceleration power transmission path 60*pa* and the power transmission members on the acceleration power transmission path 60*pa* may be changed, too. For this reason, even if the shock suppression control performed before the change of the gear position is continued, the shock due to the contact between the power transmission members on the power transmission path after the change may not be suppressed. Meanwhile, the shock suppression control may not be necessary because no shock may occur due to the contact between the power transmission members on the power transmission path after the change. The ECU 90 terminates the shock suppression control when a request to change the gear position of the transmission 50 is made or a change of the gear position of the transmission 50 is detected. It is therefore possible to prevent the shock suppression control from being unnecessarily performed.

The following effect is obtained by not performing the shock suppression control when the non-start condition B3 of the shock suppression control is established. The non-start condition B3 of the shock suppression control is that it is determined that the blipping operation has been performed. When the shock suppression control is performed during the blipping operation, the driving source torque which is supposed to increase due to the blipping operation does not increase. Therefore smooth down shift may not be achieved even though the blipping operation is performed. The ECU 90 does not perform the shock suppression control when it is determined that the blipping operation has been performed. Therefore smooth down shift by the blipping operation can be achieved.

The preferred embodiment of the present teaching has been described above. However, the present teaching is not limited to the above-described embodiment and the specific example of the embodiment, and various changes can be made within the scope of the claims. The following describes modifications of the embodiment of the present teaching.

<Modifications of Driving Wheel>

In the specific example of the embodiment above, the rear wheel 3 is a driving wheel. In the present teaching, the driving wheel of the vehicle may be the front wheel. Both of the front wheel and the rear wheel may be driving wheels.

<Modification of Control Method of Throttle Valve>

In the specific example of the embodiment above, the control method of the throttle valve 37 is electronic control. In the present teaching, the control method of the throttle valve may be mechanical control. In other words, the throttle valve may be connected to the acceleration operator through a throttle wire.

<Modifications of Engine>

In the embodiment above and its specific example, the engine 20A (driving source) is a gasoline engine. The engine of the present teaching may be a diesel engine. The engine of the present teaching may be a hydrogen rotary engine.

In the embodiment above and its specific example, the engine 20A (driving source) is a four-stroke engine. Alternatively, in the present teaching, the engine of the present teaching may be a two-stroke engine.

In the specific example of the embodiment above, the engine 20A is a single-cylinder engine. Alternatively, in the present teaching, the engine may be a multi-cylinder engine. The number of cylinders is not limited. When the engine of the present teaching is a multi-cylinder engine, the intake system is preferably of an independent throttle type. In the independent throttle type, a throttle valve is provided for each combustion chamber.

The engine of the present teaching may be an engine with a forced-induction compressor. The forced-induction compressor is configured to compress air supplied to a combustion chamber. The forced-induction compressor may be a supercharger (mechanical supercharger) or a turbocharger (exhaust turbine supercharger).

<Modifications of Driving Source>

In the embodiment above and its specific example, the driving source is the engine 20A. Alternatively, in the present teaching, the driving source may be an electric motor. The driving source may be both an engine and an electric motor. When the driving source is an electric motor, the vehicle includes an acceleration operator which is operated by the rider to adjust the driving source torque. The driving source torque may be detected based on the degree of movement of the acceleration operator. When the driving source includes an electric motor, a driving source rotation speed sensor may be provided to detect the rotation speed of the driving source. In the same manner as in the termination conditions C2 and C3 described above, the driving source torque controller may determine a timing to terminate the shock suppression control based on a signal from the driving source rotation speed sensor.

<Modifications of Power Transmission Members>

The power transmission members of the present teaching may be gears which are engaged with one another. The gears are not limited to spur gears, and encompass all types of known gears such as bevel gears and helical gears. The power transmission members of the present teaching may be a dog member having a dog projection and a dog member having a dog recess in which the dog projection can be fitted. The power transmission members of the present teaching may be a spline member having a spline hole and a spline member (spline shaft) which can be fitted into the spline hole. The power transmission members of the present teaching may be a sprocket and a chain. The power transmission members of the present teaching may be pulleys and a belt. The belt is a synchronous power transmission belt. The synchronous power transmission belt is a belt with teeth, for example. The belt may be made of metal or rubber.

<Modifications of Transmission>

In the specific example of the embodiment above, the transmission 50 is a manual transmission. The transmission of the present teaching may be a full-automatic transmission. The transmission may be a semi-automatic transmission. In the manual transmission, the gear is switched as the rider operates the clutch lever and the shift pedal. In the full-automatic transmission, a shift actuator is automatically driven in accordance with the vehicle speed, the engine rotation speed, etc., so that the gear is switched. In the semi-automatic transmission, only clutch operation is automatically done, and the gear is switched as the rider operates the shift pedal.

In the specific example of the embodiment above, the transmission 50 is a constant-mesh transmission which does not have a synchromesh mechanism. In the present teaching, the transmission may be a constant-mesh transmission having a synchromesh mechanism. The synchromesh mechanism is a mechanism of synchronizing the speeds of two gears which are lined up in the axial direction and have a dog recess and a dog projection which can be engaged with each other. The transmission may be a selective sliding-gear transmission (sliding mesh transmission). In the selective sliding-gear transmission, a gear slides in the axial direction and is engaged with another gear. The transmission of the present teaching may include a sub transmission. The transmission of the present teaching may not be a sequential shift transmission.

In the specific example of the embodiment above, the power transmission mechanism 60 includes the transmission 50 in which gear positions with different transmission ratios are selectable. Alternatively, in the present teaching, the power transmission mechanism may include a continuously variable transmission which continuously changes the transmission ratio.

In the embodiment above and its specific example, the power transmission mechanism 60 includes the transmission 50. Alternatively, in the present teaching, the power transmission mechanism may not include any types (including a continuously variable transmission) of transmissions.

<Alternative Example of Estimation of Driving Source Torque>

In the specific example of the embodiment above, the ECU 90 (driving source torque controller) estimates the driving source torque based on a signal from the throttle opening degree sensor 82 and a signal from the engine rotation speed sensor 81. Alternatively, in the present teaching, the driving source torque controller may estimate the driving source torque by a different method. For example, the driving source torque may be estimated based on a signal from an accelerator sensor (72) and a signal from an engine rotation speed sensor (81). The opening degree of a throttle valve (37) is changed based on the degree of movement of an acceleration operator detected by the accelerator sensor (72). Because the driving source torque is estimated based on a signal from the accelerator sensor (72), a change in the torque can be discerned before an actual change of the driving source torque. This makes it possible to promptly detect a state in which shock to the vehicle may occur. As a result, the suppression of the occurrence of shock to the vehicle is further ensured. A typical vehicle may include an accelerator sensor. It is therefore possible to estimate the driving source torque by using the sensor which is typically included in vehicles. In other words, it is unnecessary to provide an additional sensor for shock suppression control.

The driving source torque controller of the present teaching may estimate the driving source torque based on a signal from a throttle opening degree sensor (82), a signal from an engine rotation speed sensor (81), and an ignition timing of an ignition device (29). In this case, the driving source torque is further accurately estimated as compared to cases where a signal from the throttle opening degree sensor (82) and a signal from the engine rotation speed sensor (81) are used but an ignition timing is not used for the estimation of the driving source torque. The suppression of the occurrence of shock to the vehicle is therefore further ensured.

<Alternative Example of Acquisition of Driving Source Torque>

The driving source torque controller of the present teaching may include a driving source torque sensor which is configured to detect a driving source torque. In other words, in the specific example of the embodiment above, the driving source torque detected by the driving source torque sensor may be used in place of the estimated driving source torque. With this arrangement, the driving source torque controller is able to further accurately acquire the torque as compared to cases where the driving source torque is estimated. In terms of the non-necessity of the driving source torque sensor, the driving torque is preferably acquired by estimating the driving torque. The driving source torque controller of the present teaching may use both the estimated driving source torque and the driving source torque detected by the driving source torque sensor. In the same manner as the estimated driving source torque, the driving source torque detected by the driving source torque sensor is scarcely delayed from an actual driving source torque.

<Alternative Example of Shock Suppression Control>

The conditions for starting the shock suppression control in the present teaching are not limited to the above-described conditions A1, A2, and B1 to B3. The condition for terminating the shock suppression control are not limited to the above-described conditions C1 to C4, D1, and D2.

The shock suppression control of the present teaching may be performed when driving assist control such as adaptive cruise control (ACC) is being performed. When the shock suppression control is performed while the driving assist control is being performed, an acceleration request generated by the driving source torque controller is used in place of a detection signal from the accelerator sensor. When the shock suppression control is performed while the driving assist control is being performed, a clutch request generated by the driving source torque controller is used in place of a detection signal from the clutch sensor 73. When the shock suppression control is performed while the driving assist control is being performed, the gear position change request is not based on an operation of the shift pedal or shift switch but is generated by the driving source torque controller. The adaptive cruise control (ACC) is also known as auto cruise control or active cruise control. The ACC is control for causing the host vehicle to follow the preceding vehicle while maintaining a distance from the preceding vehicle.

The driving source torque controller of the present teaching may perform the shock suppression control of suppressing the shock to the vehicle occurring when backlash between the power transmission members on the deceleration power transmission path is eliminated, when the driving source torque is controlled to decelerate the driving wheel. In other words, the shock suppression control may be performed when the driving wheel is switched from the acceleration state to the deceleration state. To be more specific, the driving source torque controller controls the driving source torque based on an acquired driving source torque so that at least one of (i) the absolute value of the relative speed between the power transmission members on the deceleration power transmission path decreases when the backlash between the power transmission members decreases or (ii) the transmission torque transmitted between the power transmission members on the deceleration power transmission path decreases when the backlash between the power transmission members is eliminated.

<Modifications of Vehicle>

The vehicle of the present teaching includes the front wheel and the rear wheel. The number of the front wheel may be one, or more than one. The number of the rear wheel may be one, or more than one. It should be noted that the vehicle of the present teaching is not limited to a motorcycle. The vehicle of the present teaching may be an automobile. The vehicle of the present teaching includes at least one front wheel and at least one rear wheel. The vehicle of the present teaching is preferably a vehicle in which no torque converter is provided on the power transmission path. The vehicle of the present teaching may be a straddled vehicle which is not a motorcycle. A straddled vehicle indicates all types of vehicles on which a rider rides in a manner of straddling a saddle. The straddled vehicle encompasses motorcycles, tricycles, four-wheeled buggies (ATVs: All Terrain Vehicles), and the like. The motorcycle encompasses scooters, engine-equipped bicycles, mopeds, or the like.

A driving source torque acquisition unit, a shock suppression controlling unit, a power transmission state detection unit, a power transmission impossibility detection unit, a gear position acquisition unit, and a blipping operation determination unit of Tokugan 2017-137667 which is the basic application of the subject application are encompassed in the driving source torque controller of the subject application.

REFERENCE SIGNS LIST 1 vehicle, motorcycle
2 front wheel
3 driving wheel, rear wheel
20 engine unit
20A engine
20B power transmission unit
25 crankshaft
28 combustion chamber
29 ignition plug (ignition device)
30 ignition coil
35 injector
36 fuel pump
37 throttle valve
40 drive gear (power transmission member)
41 driven gear (power transmission member)
43 drive sprocket (power transmission member)
50 transmission
51 input shaft
52 output shaft
53 ($53a$, $53b$, $53c$, $53d$, $53e$, $53f$) gear (power transmission member)
54 ($54p$, $54q$, $54r$, $54s$, $54t$, $54u$) gear (power transmission member)
55 ($55c$, $55d$, $55q1$, $55q2$, $55t1$, $55t2$) dog projection
56 ($56b$, $56e$, $56p$, $56r$, $56s$, $56u$) dog recess
57, 58 teeth portion
60 power transmission mechanism
$60p$ power transmission path
$60pa$ acceleration power transmission path
61, 62 power transmission member
64 driven sprocket (power transmission member)
65 chain (power transmission member)
72 accelerator sensor
73 clutch sensor
81 engine rotation speed sensor (driving source rotation speed sensor)
82 throttle opening degree sensor
83 input shaft sensor
84 output shaft sensor
85 gear position sensor
86 neutral sensor
91 driving source torque controller
90 ECU (driving source torque controller)
G1, Gd, Gtd backlash

What is claimed is:

1. A vehicle comprising:
a driving source;
a driving wheel;
power transmission members which are provided on a power transmission path on which power is transmitted between the driving source and the driving wheel; and
a driving source torque controller which is configured to control a driving source torque generated by the driving source, wherein
the driving source torque controller is configured to acquire the driving source torque, and when the driving source torque is controlled to accelerate the driving wheel, the driving source torque controller is configured to suppress shock to the vehicle which occurs when backlash between the power transmission members on the power transmission path is eliminated, by performing shock suppression control to control the driving source torque based on the acquired driving source torque, and during the shock suppression control, decrease and then increase the driving source torque so that at least one of (i) an absolute value of relative speed between the power transmission members on the power transmission path decreases when the backlash between the power transmission members decreases, as compared to cases where the shock suppression control is not performed or (ii) a transmission torque transmitted between the power transmission members on the power transmission path decreases when the backlash between the power transmission members is eliminated, as compared to the case where the shock su control is not performed.

2. The vehicle according to claim 1, wherein the driving source torque controller determines a timing to start the shock suppression control based on the acquired driving source torque.

3. The vehicle according to claim 1, wherein the driving source torque controller acquires the driving source torque by estimating the driving source torque.

4. The vehicle according to claim 3, wherein
the driving source is an engine having a combustion chamber,
the vehicle further comprises:
an engine rotation speed sensor which is configured to detect engine rotation speed;
a throttle valve which adjusts an amount of air supplied to the combustion chamber; and
a throttle sensor which is configured to detect an opening degree of the throttle valve, and
the driving source torque controller estimates the driving source torque based on a signal from the throttle sensor and a signal from the engine rotation speed sensor.

5. The vehicle according to claim 4, wherein
the engine includes an ignition device which is configured to ignite an air-fuel mixture of fuel and air in the combustion chamber, and
the driving source torque controller estimates the driving source torque based on a signal from the throttle sensor, a signal from the engine rotation speed sensor, and an ignition timing of the ignition device.

6. The vehicle according to claim 3, wherein
the driving source is an engine having a combustion chamber,
the vehicle further comprises:
an engine rotation speed sensor which is configured to detect engine rotation speed;
a throttle valve which adjusts an amount of air supplied to the combustion chamber;
an acceleration operator which is operable to change an opening degree of the throttle valve; and
an accelerator sensor configured to detect a degree of movement of the acceleration operator, and
the driving source torque controller estimates the driving source torque based on a signal from the accelerator sensor and a signal from the engine rotation speed sensor.

7. The vehicle according to claim 6, wherein
the engine includes an ignition device which is configured to ignite an air-fuel mixture of fuel and air in the combustion chamber, and
the driving source torque controller estimates the driving source torque based on a signal from the accelerator sensor, a signal from the engine rotation speed sensor, and an ignition timing of the ignition device.

8. The vehicle according to claim 1, wherein, the driving source torque controller starts the shock suppression control when the acquired driving source torque becomes equal to or larger than a first threshold torque.

9. The vehicle according to claim 1, wherein the driving source torque controller calculates a time integrated value of the acquired driving source torque from a point of time where the driving source torque becomes equal to or larger than a second threshold torque, and starts the shock suppression control when the time integrated value becomes equal to or larger than a threshold value.

10. The vehicle according to claim 1, wherein the driving source torque controller determines a timing to terminate the shock suppression control based on an elapsed time.

11. The vehicle according to claim 1, further comprising:
a driving source rotation speed sensor which is configured to detect rotation speed of the driving source,
wherein after the shock suppression control is started, the driving source torque controller determines a timing to terminate the shock suppression control based on a signal from the driving source rotation speed sensor.

12. The vehicle according to claim 1, further comprising:
an input shaft which is provided on the power transmission path; and
an output shaft which is provided on the power transmission path and between the input shaft and the driving wheel,
wherein the driving source torque controller is configured to detect a relative rotational angle between the input shaft and the output shaft, and after the shock suppression control is started, the driving source torque controller determines, a timing to terminate the shock suppression control based on the detected relative rotational angle between the input shaft and the output shaft.

13. The vehicle according to claim 1, wherein the driving source torque controller is configured to detect a state in which power cannot be transmitted between the driving source and the driving wheel, and after the shock suppression control is started, the driving source torque controller terminates the shock suppression control in response to detecting the state in which power cannot be transmitted between the driving source and the driving wheel.

14. The vehicle according to claim 1, wherein
the driving source is an engine having a combustion chamber,
the vehicle further comprises a transmission which has selectable gear positions,
the driving source torque controller is configured to acquire a current gear position of the transmission, and in response to a request to change the gear position of the transmission or to detection of a change in the gear position of the transmission, the driving source torque controller terminates the shock suppression control.

15. The vehicle according to claim 1, wherein
the driving source is an engine having a combustion chamber,
the vehicle further comprises a transmission which includes an input shaft provided on the power transmission path and an output shaft which is provided on the power transmission path and between the input shaft and the driving wheel, the transmission having selectable gear positions which are different in a ratio of rotation speed of the input shaft to rotation speed of the output shaft, the driving source torque controller is configured to determine whether a blipping operation is performed, the blipping operation temporarily increasing the driving source torque in response to a gear position being changed to increase the ratio of the rotation speed of the input shaft to the rotation speed of the output shaft, and in response to determining that the blipping operation is performed, the driving source torque controller does not perform the shock suppression control.

* * * * *